(12) United States Patent
Chen et al.

(10) Patent No.: US 8,007,671 B2
(45) Date of Patent: Aug. 30, 2011

(54) MICROFILTRATION DEVICES

(75) Inventors: Wei-Chih Chen, Duluth, GA (US);
Kevin P. Nicolazzo, Bethlehem, GA (US); Bryan E. Kepner, Lancaster, PA (US)

(73) Assignee: Streamline Capital, Inc., Atlanta, GA (US)

( * ) Notice: Subject to any disclaimer, the term of this patent is extended or adjusted under 35 U.S.C. 154(b) by 696 days.

(21) Appl. No.: 11/503,655

(22) Filed: Aug. 14, 2006

(65) Prior Publication Data
US 2007/0062870 A1    Mar. 22, 2007

Related U.S. Application Data

(60) Provisional application No. 60/708,700, filed on Aug. 15, 2005, provisional application No. 60/717,379, filed on Sep. 15, 2005, provisional application No. 60/727,470, filed on Oct. 17, 2005.

(51) Int. Cl.
*B01D 63/02* (2006.01)
*B01D 24/12* (2006.01)
*B01D 61/149* (2006.01)

(52) U.S. Cl. ............. 210/321.64; 210/321.88; 210/455; 210/477; 210/503

(58) Field of Classification Search .................. None
See application file for complete search history.

(56) References Cited

U.S. PATENT DOCUMENTS

| 4,636,307 | A  | * | 1/1987 | Inoue et al. .................. 210/188 |
| 5,545,315 | A  | * | 8/1996 | Lonneman ................. 210/120 |
| 5,997,829 | A  |   | 12/1999 | Sekine et al. |
| 6,171,496 | B1 | * | 1/2001 | Patil ............................. 210/484 |
| 6,565,749 | B1 |   | 5/2003 | Hou |
| 6,833,075 | B2 |   | 12/2004 | Hughes |
| 6,919,029 | B2 |   | 7/2005 | Meng |
| 2001/0045398 | A1 |   | 11/2001 | Messier |
| 2003/0164333 | A1 | * | 9/2003 | Nohren et al. ............... 210/650 |
| 2004/0262225 | A1 | * | 12/2004 | C. et al. ........................ 210/638 |
| 2005/0000883 | A1 | * | 1/2005 | Kouters et al. .......... 210/321.89 |
| 2005/0139535 | A1 |   | 6/2005 | King |

FOREIGN PATENT DOCUMENTS

| GB | 1468928 | 3/1977 |
| JP | 05068964 | 3/1993 |
| JP | 09187769 | 7/1997 |
| WO | 2005 110583 | 11/2005 |

* cited by examiner

*Primary Examiner* — Krishnan S Menon
(74) *Attorney, Agent, or Firm* — Law Offices of John A. Parrish

(57) ABSTRACT

A method of treating a hollow fiber membrane microfiltration filter having an influent side and an effluent side to improve performance of the filter is disclosed. The method entails sealing imperfections in surfaces of the filter by flushing the filter with a liquid aqueous suspension of particulates. Filter cartridge devices also are disclosed. The devices may include a bactericidal chamber. A radial flow filter may be included in the devices. The filter cartridges may include a drain tube positioned within the filter for removing of effluent generated by the filter. A plurality of filter cartridges may be positioned on the drain tube.

4 Claims, 21 Drawing Sheets

FIG. 14B
FIG. 14A
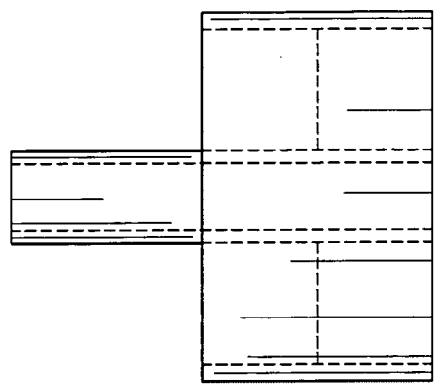
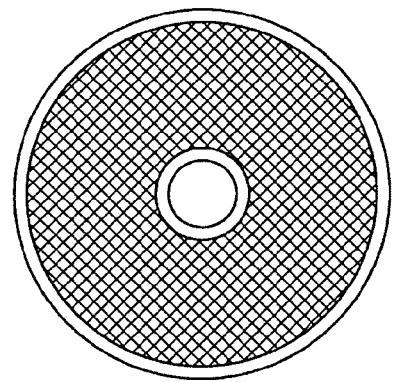
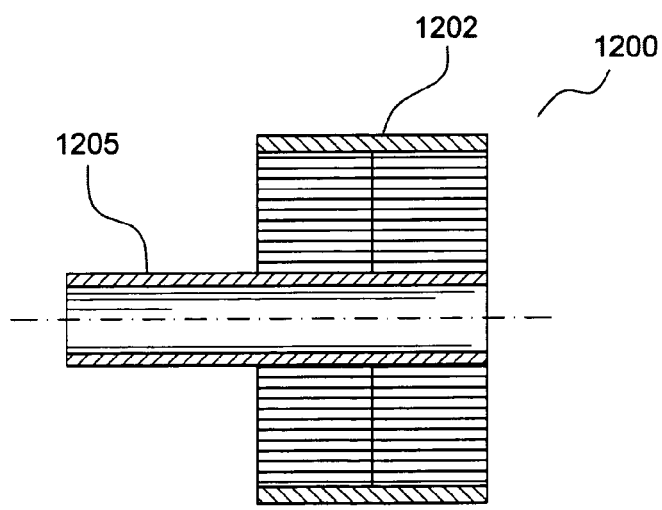
FIG. 14C

FIG. 15A
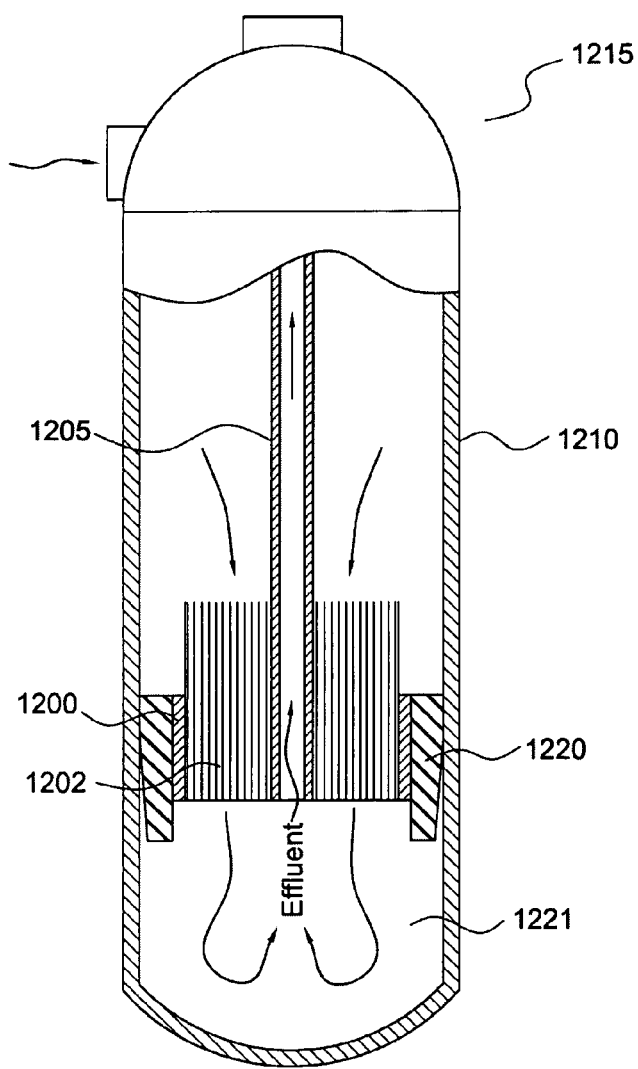
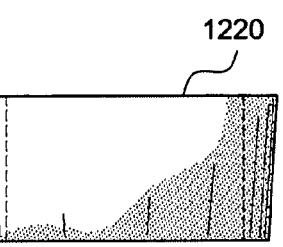
FIG. 15B
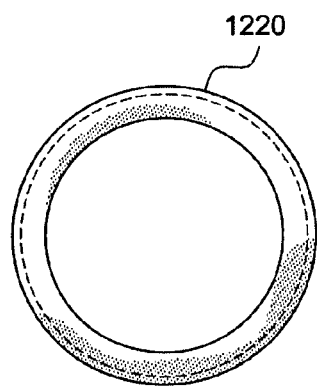
FIG. 15C

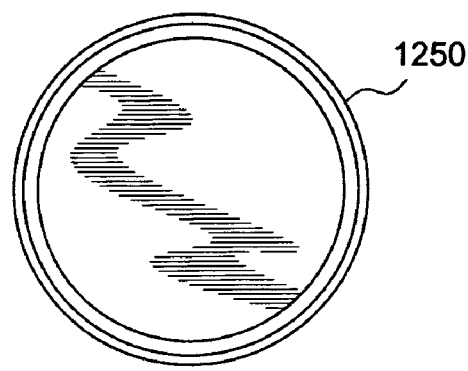
FIG. 17
FIG. 17A
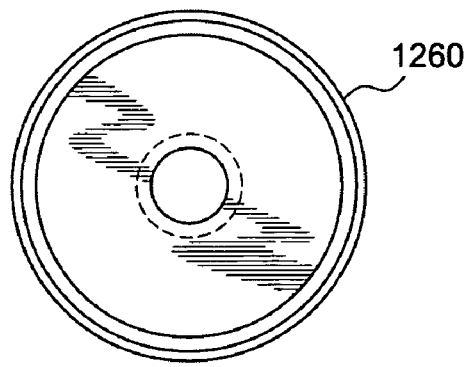
FIG. 17B
FIG. 17C

MICROFILTRATION DEVICES

This application claims priority to provisional patent application 60/708,700 filed Aug. 15, 2005, and to provisional patent application 60/717379 filed Sep. 15, 2005 and to provisional patent application 60/727470 filed Oct. 17, 2005.

FIELD OF THE INVENTION

The invention relates to microfiltration filters, devices which employ those filters, and to methods for improving their performance.

BACKGROUND OF THE INVENTION

Microfiltration membranes are well known for use in removing particulates as small as 0.1 µm diameter and microorganisms as small as about 0.2 µm diameter from fluids such as water and air. These microporous membranes are made of organic polymers or sintered inorganic materials. In order to achieve these levels of filtration performance, microfiltration membrane filters such as those for use in pharmaceutical applications must pass costly, rigid quality control tests. Failed products must be discarded or downgraded for use in less demanding applications. Moreover, it is not unusual to observe bacteria growing through a microporous filter when water is stagnated in the filter for a period of time such as overnight.

Microfiltration filters such as pleated membranes and hollow fiber membrane (HFM) modules designed to filter microorganisms from drinking water are known. However, quality control of these types of products which are sold to consumer markets such as for use with drinking water are usually less stringent then those for pharmaceutical applications. Furthermore, the filtration performance of microfiltration filters intended for use with drinking water may be reduced by plugging caused by small particles and insoluble organic matter in the influent water which plug the filter.

Various prefiltration methods and materials have been used to protect microfiltration filters against undesirable plugging. Although these methods and materials are relatively expensive, it is known that the application of a pre-coat of fine particulate to an ordinary septum filter may significantly improve the efficiency and reliability of the filter as well as its useful life. The areal density of the pre-coat of fine particulate is typically more than 200 g/m$^2$. It is also known to add bacteriastatic agents such as silver, copper, and zinc ion release media to the influent surfaces of microfiltration filters to prevent or reduce any bacteria retained in the filter from growing. However, these agents may not kill all of the bacteria and none of these agents have been employed to treat the filtered effluent water to kill remaining bacteria in the effluent.

Although the pre-coat prefiltration methods and materials of the prior art have been useful for improving filtration efficiency, filter life and reliability, these methods must build a layer of filter cake of particulate over all of the filtration surfaces. A continuing need therefore exists for low cost prefiltration methods to protect microfiltration filters and to improve their reliability to remove microorganisms such as those larger than 0.2 µm in diameter for use in applications such as filtration of drinking water.

A continuing need also exists for improving the ability of microfiltration filters to achieve increased removal of bacteria from water.

It also is known that when installing a carbon block or hollow fiber membrane module filter inside a filter casing, an end-cap adapter or an O-ring seal is used to make the connection and achieve a tight seal. The disadvantage of this known method is high cost and lack of flexibility to adjust the location of the hollow fiber membrane module in the filter casing as well as lack of reliability of the rubber O-ring seal. Moreover, even though double O-ring designs have been used in filters to reduce the likelihood of failure, the O-ring may be displaced during installation of the membrane module and lead to failure.

A need therefore exists for filters which overcome the disadvantages of the prior art.

Methods also are known in the art to stack pleated microfiltration filter modules to achieve flow rates greater than those of single pleated microfiltration filter modules. These methods, however, have not been applied to produce stacked hollow fiber membrane modules due to flow direction in the hollow fiber membrane modules. A need therefore also exists for a method for stacking hollow fiber membrane modules and filter cartridge devices which employ stacked hollow fiber membranes.

SUMMARY OF THE INVENTION

A method of treating a hollow fiber membrane microfiltration filter having an influent side and an effluent side to improve performance of the filter is disclosed. The method entails sealing imperfections in surfaces of the filter by flushing the filter with an aqueous suspension of particulates to achieve a coating of particulates of an areal density of about 0.01 mg/cm$^2$ to about 20 mg/cm$^2$, preferably an areal density of about 0.1 mg/cm$^2$ to about 10 mg/cm$^2$ on surfaces of the filter. The suspension includes particulates in an amount of about 0.01 gm/l to about 20 gm/l, preferably about 0.05 gm/l to about 10 gm/l, of a median particle diameter of about 5 µm to about 50 µm and a particle size range of about 0.1 µm to about 200 µm, preferably a median particle diameter of about 5 µm to about 30 µm, particle size range of about 0.1 µm to about 100 µm preferably and flushing of the filter is performed at a flow rate of about 0.02 ml/min/cm$^2$ to about 2 ml/min/cm$^2$. The particulates may be any of diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof, as well as any of clays, zeolites, (FeOOH), and mixtures thereof. The particulates may be impregnated with anti-microbial agents such as silver, copper, zinc and mixtures thereof, preferably silver.

Another aspect of a method of treating a microfiltration filter having an influent side and an effluent side to improve performance of the filter also is disclosed. This method entails sealing imperfections in surfaces of the filter by flushing the filter with an aqueous suspension of particulates to achieve a coating of particulates of an areal density of about 0.01 mg/cm$^2$ to about 20 mg/cm$^2$ on surfaces of the filter, the suspension having particulates in an amount of about 0.01 gm/l to about 20 gm/l, the particulates having median particle diameter of about 5 µm to about 50 µm and a particle size range of about 0.1 µm to about 200 µm, where flushing of the filter is performed at a flow rate of about 0.02 ml/min/cm$^2$ to about 2 ml/min/cm$^2$.

Another aspect of a method of treating a microfiltration filter having an influent side and an effluent side to improve performance of the filter is disclosed. This aspect entails sealing imperfections in surfaces of the filter by flushing the filter with an organic suspension of particulates to achieve a coating of particulates of an areal density of about 0.01 mg/cm$^2$ to about 20 mg/cm$^2$ on surfaces of the filter, the suspension formed of an organic vehicle having particulates in an amount of about 0.01 gm/l to about 20 gm/l, the particulates having median particle diameter of about 5 µm to about 50 µm and a particle size range of about 0.1 µm to about 200 µm, where flushing of the filter is performed at a flow rate of about 0.02 ml/min/cm$^2$ to about 2 ml/min/cm$^2$, and where the organic vehicle is an alkanol selected from the group consisting of methanol, ethanol, propanol, butanol and mixtures thereof. The organic vehicle also may include water. In this aspect, particulates which may be used include but are not limited to surface activated titanium dioxide, diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof, as well as clays, zeolites, (FeOOH), and mixtures thereof.

Also disclosed is a method of treating a hollow fiber membrane microfiltration filter having an influent side and an effluent side to improve performance of the filter. The method entails placing the filter in a filter housing for retaining the filter, the filter housing having an amount of particulates for sealing imperfections in surfaces of the filter, flushing water through the particulates to achieve a coating of particulates on surfaces of the filter, the particulates having median particle size range of about 0.1 µm to about 200 µm, preferably about 0.1 µm to about 100 µm. Flushing of the water is performed at a flow rate of about 0.3 gal/min to about 2 gal/min. The amount of particulates is sufficient to achieve a coating of particulates of an areal density of about 0.01 mg/cm$^2$ to about 20 mg/cm$^2$. Particulates which may be employed include but are not limited to surface activated titanium dioxide, diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof as well as clays, zeolites, (FeOOH), and mixtures thereof. The filter may be included in a cartridge prior to placing the filter in the housing.

Further disclosed is a method of treating a hollow fiber membrane microfiltration filter having an influent side and an effluent side to improve performance of the filter. The method entails placing the filter in cartridge, placing an amount of particulates for sealing imperfections in surfaces of the filter in the cartridge to form an assembly, placing the assembly in a filter housing for retaining the assembly, flushing water through the particulates to achieve a coating of particulates on surfaces of the filter, the particulates having a particle size range of about 0.1 µm to about 200 µm, preferably of about 0.1 µm to about 100 µm, more preferably about 0.1 µm to about 50 µm and, flushing of the water is performed at a flow rate of about 0.1 gal/min to about 2 gal/min, preferably at a flow rate of about 0.3 gal/min to about 1.5 gal/min. Useful particulates include diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof, as well as clays, zeolites, (FeOOH), and mixtures thereof.

Further disclosed is a method treating a hollow fiber membrane microfiltration filter having an influent side and an effluent side to improve performance that entails placing the filter in a filter housing for retaining the filter wherein the filter housing includes an amount of particulates for sealing imperfections in surfaces of the filter. An organic liquid then is flushed through the particulates to achieve a coating of particulates on surfaces of the filter. The particulates have a median particle size range of about 0.1 µm to about 200 µm and flushing of the organic liquid is performed at a flow rate of about 0.3 gal/min to about 2 gal/min. The organic liquid may be any of methanol, ethanol, propanol, butanol and mixtures thereof.

A filter cartridge device having a housing having an HFM microporous filter also is disclosed. The filter cartridge includes a receiver secured to the housing, the receiver having a filter section configured to retain a microporous filter and a bactericidal chamber configured to retain bactericidal media, the receiver having an influent port and an effluent port, and an HFM microporous filter in the filter section. A porous particulate retention support may be positioned between the filter section and the bactericidal chamber and a porous particulate retention support may be located between bactericidal chamber and the effluent port. The porous particulate retention support has a pore size of about 5 µm to about 10,000 µm. The bactericidal chamber includes silver coated alumina, copper coated alumina, KDF metal, carbon, and mixtures thereof. The housing and receiver cooperatively engage to form a space around the filter in the receiver and the space includes particulates such as surface activated titanium dioxide, activated carbon, activated carbon impregnated with silver, Cu—Zn alloys, silver coated alumina, copper coated alumina, polymeric sodium polyphosphate, dipotassium phosphate and mixtures thereof. The filter may bear a coating of particulates such as activated carbon, activated carbon impregnated with silver, Cu—Zn alloys, silver coated alumina, copper coated alumina, polymeric sodium polyphosphate, dipotassium phosphate and mixtures thereof.

A filter device having a housing having an HFM microporous filter in a cartridge container is disclosed wherein the cartridge container includes an influent opening and an effluent opening and an HFM filter in the container. The housing includes an influent port and an influent port, and the cartridge container includes particulate material in contact with the filer whereby influent flows through the particulate material prior to contacting the filter. The particulate material may be any of activated carbon, activated carbon impregnated with silver, Cu—Zn alloys, silver coated alumina, copper coated alumina, polymeric sodium polyphosphate, dipotassium phosphate and mixtures thereof.

Also disclosed is a microfiltration device that includes a housing having an effluent port and a connection means for securing a cap having an influent inlet for admitting influent into the housing. An inlet prefilter in contact with the housing and having a pore size of about 5 µm to about 10,000 µm is located proximate the influent inlet, a bottom support in contact with the housing and having a pore size of about 5 µm to about 10,000 µm located proximate the effluent port of the housing and a filter, preferably an HFM filter, is cooperatively secured in the housing proximate the bottom support by a plug configured to retain the filter and to engage the housing. The plug may be tapered from its top surface to its bottom surface by about 1 to about 20 percent. The microfiltration device may be any of hollow fiber membrane modules and pleated membrane modules and may bear a coating of particulate such as surface activated titanium dioxide, diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof as well as particulates such as clays, zeolites, (FeOOH), and mixtures thereof. The filter may be positioned in the housing distal to the inlet prefilter to provide a space between the inlet prefilter and the filter device may include treatment media such as surface activated titanium dioxide, diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof, as well as treatment media is selected from the group consisting of clays, zeolites, (FeOOH), surface activated titanium dioxide and mixtures thereof.

Also disclosed is a microfiltration device that includes a housing having an effluent port and a connection means for securing a cap having an influent inlet for admitting influent into the housing, an inlet prefilter having a pore size of about 5 μm to about 10,000 μm located proximate the influent inlet, a bottom support having pore size of about 5 μm to about 10,000 μm located proximate the effluent port of the housing wherein the filter is located distal to the bottom support to form a lower space between the filter and the bottom support. Treatment media may be present in the lower space and may be any of diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof as well as clays, zeolites, (FeOOH), and mixtures thereof. The filter may have a perforated wall and the microfiltration device may include a filtration medium that includes bonded porous powdered carbon in the lower space.

Further disclosed is a microfiltration device that includes a housing having an effluent port and a connection means for securing a cap having an influent inlet for admitting influent into the housing. An inlet prefilter having a pore size of about 5 μm to about 10,000 μm is located proximate the influent inlet and a bottom support having pore size of about 5 μm to about 10,000 μm is located proximate the effluent port of the housing. A radial flow filter having a top surface and a bottom surface is positioned in the housing for engaging the bottom support, and a spacer is positioned in the housing for engaging the top surface of the radial flow filter. A microfiltration filter positioned in the housing to engage the spacer and to form an upper space between the microfiltration filter and the cap. Preferably, the microfiltration filter is an HFM filter and the radial flow filter is carbon. The upper space may include treatment media such as surface activated titanium dioxide, diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof, as well as treatment media is selected from the group consisting of clays, zeolites, (FeOOH), and mixtures thereof.

Also disclosed is a filter cartridge that includes a hollow fiber membrane filter and a drain tube positioned within the filter for removing of effluent generated by the filter. The tube may have a tapered inner diameter. The drain tube has an inner diameter sufficient to achieve a flow rate of effluent that equals the flow rate of influent into the filter. A plurality of filter cartridges may be positioned on the drain tube wherein the filter cartridges are positioned to form an upper space between adjacent cartridges and to form a lower space between one of the cartridges and the housing. A treatment media may be present in any of the upper space or the lower space and the treatment media may be any of diatomaceous earth, pumice, perlite, silica, alumina, activated carbon, silver, copper, glass fibers, polyethylene, polypropylene, cellulose, metal oxides, metal hydroxides, polyesters, graphite, polyphosphates, glass and mixtures thereof as well as any of clays, zeolites, (FeOOH), and mixtures thereof.

Further disclosed is a hollow tube membrane filtration device that includes a housing having an influent port and an effluent port and a plurality of filter cartridges positioned on a drain tube. The filter cartridges are positioned to form an upper space between adjacent cartridges and to form a lower space between one of the cartridges and the housing. The cartridges are operatively connected to the housing by a plug having peripheral slots for enabling influent to between adjacent filter cartridges.

Also disclosed is a filter cartridge that includes a container that includes pores for admitting influent to a plurality of filter modules positioned in the container. The container includes an effluent port for enabling effluent to exit the container. At least a first of the filter modules has an inlet for cooperative engagement with a second of the filter modules and the inlet receives effluent from the second of the filter modules to enable effluent from one of the filter modules is received as influent by another of the filter modules. At least one of the filter modules engages the effluent port of the container. The filter cartridge may include a prefiltration wrap secured to the exterior surface the container.

BRIEF DESCRIPTION OF THE DRAWINGS

FIG. 7A is a top view of a spacer for use in the filter of FIG. 7;

FIG. 7B is a side view of the spacer shown in FIG. 7A:

FIG. 14A is a top view of a center flow hollow fiber filtration module;

FIG. 14B is a side view of the module of FIG. 14A;

FIG. 14C is a cross sectional view of the module of FIG. 14A;

FIG. 15A is a partial cross section of a single module hollow tube filter which includes a hollow fiber membrane module;

FIG. 15B is a side view of a rubber seal for use in the filter device shown in FIG. 15A;

FIG. 15C is a top view of the rubber seal shown in FIG. 15B;

FIGS. 17, 17A are views of a closed end cap;

FIGS. 17B, C are views of an open end cap;

DETAILED DESCRIPTION OF THE INVENTION

Figure 1:
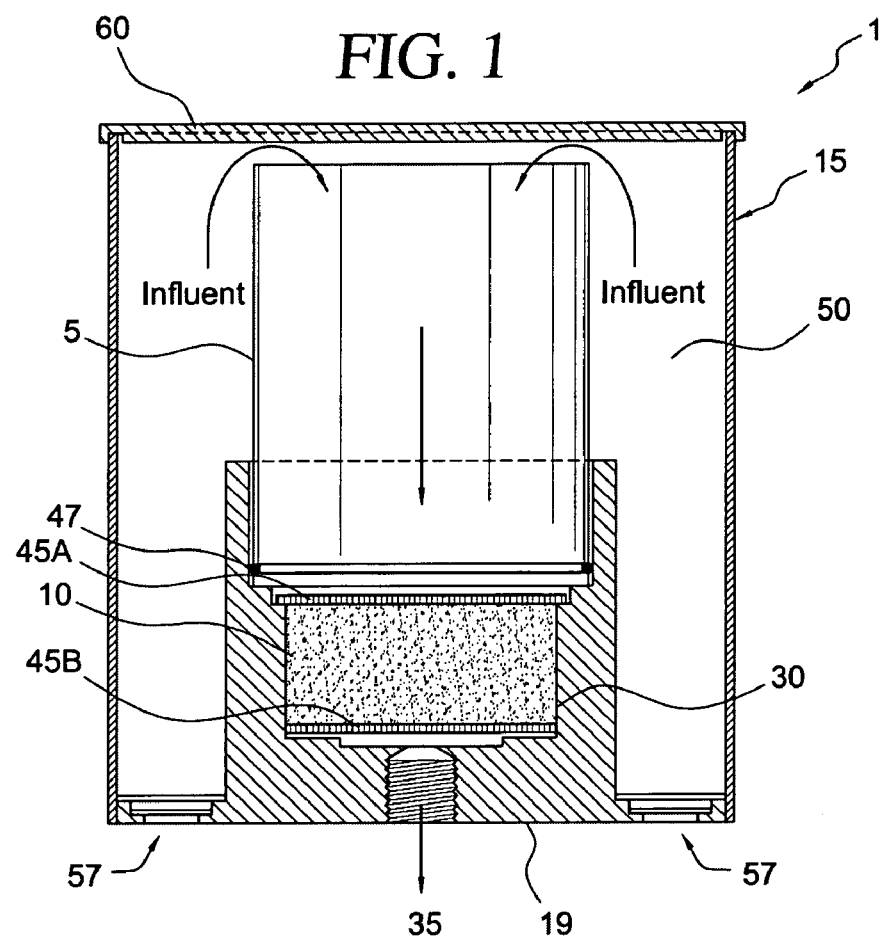
FIG. 1 is a side cross-sectional view of a microporous filter device that includes a microporous filter with a bactericidal chamber.

In a first aspect, prefiltration methods for improving the performance of microfiltration devices are disclosed. The prefiltration methods generally entail precoating a microfiltration filter such as an "HFM" module. Precoating is done by flushing the filter with an aqueous suspension of particulates at a flow rate of about 0.02 ml/min/cm$^2$ to about 2 ml/min/cm$^2$, preferably about 0.1 ml/min/cm$^2$ to about 1.5 ml/min/cm$^2$, more preferably about 0.3 ml/min/cm$^2$ to about 0.8 ml/min/cm$^2$ to seal minor imperfections in the microfiltration filter. The particulates coated onto the filter permit liquids to flow through the filter without causing a significant increase in differential pressure between the inlet and the outlet of the filter. Typically, this differential pressure is less than up to about 10 psi, preferably less than up to about 2 psi. The particulates typically achieve precoating of a filter in less than about five minutes.

In another aspect, new filtration devices which include microfiltration filters are disclosed. These devices may be used with a wide variety of influents such as aqueous liquids, organic liquids such as alcohols, as well as gases such as air and nitrogen. These devices may include additional treatment media for use with various types of influents. Treatment media which may be employed with aqueous liquid influents include but are not limited to surface activated titanium dioxide, diatomaceous earth, pumice, clays, perlite, silica, alumina, zeolites, activated carbon, metals such as silver, copper and zinc, glass fibers, fibrillated fibers such as polyethylene, polypropylene and cellulose, metal oxides and hydroxides such as ferric oxide-hydroxide (FeOOH), micro fibers of polyesters, graphite, polyphosphates, glass and alumina and mixtures thereof. Treatment media which may be employed with gaseous influents such as nitrogen and air include but are not limited to zeolites, activated carbon, alumina, silica, MB2001, MB2002, and MB2200 and mixtures thereof. Treatment media which may be employed with organic liquid influents which include such as C1-C4 alkanols include but are not limited to zeolites, alumina, silica, and ion-exchange resins and mixtures thereof.

Precoat Particulate Materials

Precoat particulate materials which may be employed typically have a wide particle size distribution. Precoat particulate materials which may be used typically have a median particle diameter of about 5 μm to about 50 μm, preferably about 5 μm to about 30 μm, more preferably about 5 μm to about 20 μm, a particle size range of about 0.1 μm to about 200 μm, preferably about 0.1 μm to about 100 μm, more preferably about 0.1 μm to about 50 μm. Amounts of particulate materials coated onto a microfiltration filter membrane typically are sufficient to generate areal densities of particulate materials on a microfiltration filter of about 0.01 mg/cm$^2$ to about 20 mg/cm$^2$, preferably about 0.1 mg/cm$^2$ to about 10 mg/cm$^2$, more preferably about 0.1 mg/cm$^2$ to about 5.0 mg/cm$^2$.

Examples of precoat particulate materials which may be used include but are not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH), micro fibers of polyesters, graphite, glass and alumina and mixtures thereof. The precoat particulate materials may be surface modified or impregnated with anti-microbial agents to inhibit the growth of or to kill bacteria on the surfaces of the microfiltration filter. Useful anti-microbial agents include but are not limited to silver, copper, and zinc, preferably silver and copper, more preferably silver. Surface activated titanium dioxides are available as MetSorb from Graver Technologies. Ferric oxide-hydroxide (FOOH) is available as AquaBind SP60 and SP70 from Apyron Technologies. Precoat particulates which are surface modified with silver and copper anti-microbial agents are available as MB2001, MB2002, MB2200 and MB2050 from Apyron Technologies. Activated carbon which has been impregnated with silver anti-microbial agents is available as X-462 and X-262 from Bestech. Apyron's MB2001 and MB2050 particulates which have been surface modified with silver and silver/copper, respectively, and Bestech's X-262 activated carbon which have been impregnated with silver are preferred.

Procedures for Applying Precoat Particulates

In a first embodiment, a suspension such as any of aqueous suspensions or organic suspensions, preferably an aqueous suspension of precoat particulates typically having about 0.01 gm/l to about 20 gm/l, more preferably about 0.05 gm/l to about 10 gm/l, even more preferably about 0.5 gm/l to about 5 gm/l is made by mixing of water and particulates. The amount of precoat particulates which may be included in the water used in the suspension may vary according to the surface area of the microfiltration device undergoing treatment. Typically, an aqueous suspension having about 1 g to about 10 g of precoat particulate such as diatomaceous earth that has a particle size range of about 0.1 μm to about 50 μm in about 0.5 gallon to about 2 gallon of water is sufficient to treat a 6000 cm$^2$ microfiltration membrane filter. Organic suspensions which may be used include but are not limited to precoat particulates of any of fibrillated polyethylene fiber available from MiniFibers, Inc. such as E990F and ESS5F grades in an alkanol such as any of methanol, ethanol, propanol and butanol and mixtures thereof. Organic suspensions of these alkanols also may be formed using precoat particulate materials such as surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH) graphite, glass and alumina and mixtures thereof.

The suspensions may be used to treat HFM and pleated membrane modules. Commercially available modules may be found at: http://www.tcn.zaq.ne.jp/membrane/english/MembManufE.htm In a second aspect, an amount of precoat particulates is added to the filter housing in which the microfiltration filter is located. An amount of initial flush liquid such as water or an alkanol such as any of methanol, ethanol, propanol and butanol and mixtures thereof, preferably water then is passed through the precoat particulates to disperse the precoat particulates onto imperfections in the microfiltration filter. Where water is used as the initial flush liquid, the amount of initial flush water, flow rate of initial flush water and the amount of precoat particulates used varies with the surface area of the microfiltration device. Precoat particulates which may be used in any of the water or alkanol initial flush liquid include but are not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH) graphite, glass and alumina and mixtures thereof. Typically about 0.1 to about 5 gal of initial flush water, preferably about 0.3 gal to about 2 gal of initial flush water, more preferably about 0.5 gal to about 1 gal of initial flush water is passed at a rate of about 0.1 gal/min to about 2 gal/min, more preferably about 0.3 gal/min to about 1.5 gal/min, through about 0.06 gm to about 120 gm, preferably about 0.6 gm to about 60 gm, more preferably about 0.6 gm to about 30 gm of particulate having a size range of about 0.1 μm to about 200 μm, preferably about 0.1 μm to about 100 μm, more preferably about 0.1 μm to about 50 μm. Typically, about 1 g to about 10 g of particulate such as diatomaceous earth having a particle size range of about 0.1 μm to about 50 μm and about 0.5 gallon of initial flush water applied at a flow rate of about 0.4 gal/min is sufficient to treat a 6000 cm² microfiltration membrane filter. Where an organic liquid such as an alkanol is employed as the initial flush liquid, the organic liquid preferably may be passed through particulates such as fibrillated polyethylene fiber available from MiniFibers, Inc. such as E990F and ESS5F grades. Typically, about 0.1 g to about 10 g of fibrillated polyethylene fiber having a fiber length range of about 2 μm to about 2000 μm and about 1 gallon of an initial flush liquid of propanol applied at a flow rate of about 0.5 gal/min may be used to treat a 6000 cm² microfiltration membrane filter.

In another aspect, an amount of precoat particulates is added to a cartridge filter having a microfiltration filter in a filter housing. The microfiltration filter typically has a 6,000 cm² filtration surface area. An amount of initial flush liquid such as water or an alkanol such as any of methanol, ethanol, propanol and butanol and mixtures thereof, preferably water then is passed through the particulates to disperse the particulates onto imperfections in the microfiltration filter. The amount of initial flush liquid, flow rate of initial flush liquid and the amount of particulates in the initial flush liquid varies with the surface area of the microfiltration filter. Precoat particulates which may be added to the cartridge filter include but are not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH) graphite, glass and alumina and mixtures thereof. Typically about 0.1 gal to about 5 gal of water, preferably about 0.3 gal to about 2 gal of water, more preferably about 0.5 gal to about 1 gal of water is passed at a rate of about 0.1 gal/min to about 2 gal/min, more preferably about 0.3 gal/min to about 1.5 gal/min, through about 0.06 gm to about 120 gm, preferably about 0.6 gm to about 60 gm, more preferably about 0.6 gm to about 30 gm of precoat particulate having a size range of about 0.1 μm to about 200 μm, preferably about 0.1 μm to about 100 μm, more preferably about 0.1 μm to about 50 μm. Typically, about 1 g to about 10 g of precoat particulate such as diatomaceous earth that has a particle size range of about 0.1 μm to about 50 μm and about 0.5 gallon of water applied at a flow rate of about 0.4 gal/min is sufficient to treat a 6000 cm² microfiltration membrane filter. Where an organic liquid such as a C1-C4 alkanol is employed as the initial flush liquid, the organic liquid preferably may be passed through particulates such as fibrillated polyethylene fiber such as E990F and ESS5F grades from MiniFibers, Inc. Typically, about 0.1 g to about 10 g of fibrillated polyethylene fiber having a particle size range of about 2 μm to about 2000 μm is added to the cartridge filter and about 0.5 to about 2 gallon of propanol at a flow rate of about 0.5 gal/min is passed through the particulate to treat a 6000 cm² microfiltration membrane filter.

Examples 1-6 illustrate this first aspect of the invention

Example B1

A commercially available HFM module having about 6000 cm² surface area and the following specifications is employed: diameter of module: 53 mm, length of module: 115 mm, composition of HFM: polypropylene, composition of module shell: ABS resin, pore size of HFM: 0.1 μm, outer diameter of HFM: 440 μm, wall thickness of HFM: 50 μm, bubble point of HFM: 0.20 Mpa; surface treatment of HFM: hydrophilic agent coating; differential pressure of water flow through module: about 2.5 psi at 0.5 GPM at room temperature. The HFM module is placed into a filter housing and subjected to an initial flushing with water at 0.5 GPM for 5 minutes to establish the initial differential pressure between the inlet and outlet of the module.

Example 1

After initial flushing of a commercially available HFM module having the specifications of the module used in Example B1, the HFM module is flushed with 0.5 gal of precoat flush water that has 1.0 gm of Dicalite 215 ("DE 215") diatomaceous earth. DE 215 diatomaceous earth, available from Grefco, has a median particle size of 10 micron and a particle size range of 0.1 micron to 30 micron. The flush water is pumped at the rate of 0.5 gal/min through the filter housing. After the flush water is pumped through the filter, both influent and effluent tubes of the filter are immersed in a drum filled with 50 gallon of Atlanta city water. The effluent from the filter is continuously circulated back to the 50-gallon drum. The differential pressure between the influent and effluent sides of the filter is measured with a differential pressure gauge. The results are shown in Table 1.

Example 2

Using a commercially available HFM module having the specifications of the module used in Example B1, the procedure of example 1 is followed except that an additional 1.0 g DE 215 is added to the flush water to achieve a total of 2.0 gm of DE 215. The results are shown in Table 1.

Example 3

Using a commercially available HFM module having the specifications of the module used in Example B1, the procedure of example 2 is followed except that additional 2.0 g DE 215 is added to the flush water to achieve a total of total 4.0 gm of DE 215. The results are shown in Table 1.

Example 4

Using a commercially available HFM module having the specifications of the module used in Example B1, the procedure of example 3 is followed except that additional 2.0 DE 215 is added to the flush water to achieve a total of 6.0 gm. The results are shown in Table 1.

Example 5

Using a commercially available HFM module having the specifications of the module used in Example B1, the procedure of example 4 is followed except that additional 2.0 g is added to the flush water to achieve a total of 8.0 gm of DE 215 is employed. The results are shown in Table 1.

Example 6

Using a commercially available HFM module having the specifications of the module used in Example B1, the procedure of example 5 is followed except that additional 2.0 g is added to the flush water to achieve a total 10.0 gm of DE 215 is employed. The results are shown in Table 1.

TABLE 1

| Example | Flow Rate of Influent Water | Amount of DE 215 in Initial Flush Water, g | Pressure Differential, PSI |
| --- | --- | --- | --- |
| B1 | 0.50 Gal/Min | 0 | 2.5 |
| 1 | 0.50 Gal/Min | 1 | 2.5 |
| 2 | 0.50 Gal/Min | 2 | 2.5 |
| 3 | 0.50 Gal/Min | 4 | 2.6 |
| 4 | 0.50 Gal/Min | 6 | 2.5 |
| 5 | 0.50 Gal/Min | 8 | 2.6 |
| 6 | 0.50 Gal/Min | 10 | 2.5 |

Example 7

This Example Illustrates a Second Embodiment of the Invention

A commercially available HFM module having the specifications of the module used in Example B1 is placed into a filter housing that has about 0.5 liter void volume. Then, 5.0 gm of DE 215 diatomaceous earth is deposited in the filter housing and then the housing is sealed. Initial flush water (Atlanta City water) then is passed through the HFM module at 1.0 gal/min for 5 min. to precoat the filter of the module with the diatomaceous earth. The pressure differential between the influent and effluent sides of the filter is measured after various amounts of Atlanta City water are processed by the filter and the net differential pressure increases after precoating are measured. For comparison, the net increase of differential pressures of a non precoated HFM is also measured. The results are shown in Table 2.

TABLE 2

| HFM untreated with Diatomaceous Earth | | HFM treated with 5 gm of Diatomaceous Earth | |
| --- | --- | --- | --- |
| Gallons of water filtered | Net Differential Pressure Increase- PSI | Gallons of water filtered | Net Differential Pressure Increase-PSI |
| 5 | 0 | 320 | 1.4 |
| 140 | 1.4 | 483 | 2.6 |
| 503 | 3.8 | 484 | 1.6 |
| 675 | 4.6 | 671 | 3.7 |
| 772 | 5.2 | 763 | 3.4 |
| 824 | 5.5 | 829 | 4.1 |
| 873 | 5.5 | 881 | 5.0 |
| 929 | 6.8 | 941 | 5.2 |
| 968 | 6.9 | 1003 | 6.1 |
| 1037 | 7.7 | 1056 | 6.4 |
| 1215 | 10.1 | 1245 | 8.0 |
| 1308 | 10.9 | 1343 | 9.6 |
| 1439 | 12.6 | 1483 | 10.4 |
| 1527 | 13.4 | 1573 | 11.3 |
| 1563 | 10.4 | 1611 | 8.9 |
| 1610 | 11.1 | 1661 | 8.4 |
| 1665 | 11.6 | 1719 | 8.7 |
| 1726 | 13.3 | 1784 | 10.4 |
| 1781 | 13.0 | 1840 | 10.0 |
| 1868 | 15.3 | 1933 | 10.9 |
| 1993 | 17.4 | 2072 | 13.3 |
| 2065 | 19.2 | 2138 | 13.8 |
| 2160 | 20.0 | 2227 | 14.4 |
| 2308 | 23.9 | 2391 | 16.1 |
| 2357 | 19.5 | 2448 | 15.3 |
| 2413 | 19.0 | 2507 | 17.7 |
| 2463 | 21.6 | 2557 | 15.7 |
| 2514 | 20.4 | 2611 | 14.6 |
| 2661 | 25.7 | 2763 | 19.4 |
| 2813 | 26.1 | 2935 | 21.0 |
| 2933 | 33.9 | 3066 | 22.6 |
| 2965 | 25.5 | 3101 | 17.0 |
| 3019 | 28.4 | 3164 | 20.4 |
| 3128 | 33.8 | 3305 | 24.4 |
| 3225 | 33.8 | 3368 | 22.4 |
| 3270 | 34.8 | 3417 | 22.5 |

Examples 8-10: These examples illustrate use of a precoated HFM module to remove *Bacillus subtilis* from eater.

Example 8

A 10 ppm chlorine solution made from 12 liters of sterile deionized water is circulated at 0.75 gpm for 10 minutes through a filter housing that has about 0.5 liter void volume and which contains a commercially available HFM having the specifications of the module used in Example B1. The chlorine solution is drained from the filter housing and then the housing is flushed with 12 L of sterile deionized water. The resulting free chlorine concentration is less than 0.05 ppm free chlorine. Then, 11 L of *Bacillus subtilis* bacteria solution that has a concentration of $9.3 \times 10^5$ per ml is pumped at 0.75 gpm through the filter. A 10 ml of sample of effluent is collected after 11 L of the bacteria solution is passed through the filter. The 10 ml sample is treated with 0.1 mL of Chamber Neutralizer Solution (5% $Na_2S_2O_3$, 7.3% sodium thioglycolate in sterile deionized water). Then, the first 10 ml sample and its five 10-fold serial dilution samples are spread onto standard TSA agar plates. The colony counting technique is the standard method. The results are shown in Table 3.

Example 9

Using a commercially available HFM module having the specifications of the module used in Example B1 is used and the procedure of example 8 is followed except that the bacteria solution employed has a concentration of $2.0 \times 10^7$ per ml. The results are shown in Table 3.

Example 10

Using a commercially available HFM module having the specifications of the module used in Example B1 is used and the procedure of example 8 is followed except that 4.91 g of Dicalite 215 is added to the HFM module by opening the housing containing the HFM module. After closing the housing, 12 L of 10 ppm chlorine solution is circulated for 10 minutes as described in example 8, followed by flushing with 12 L of sterile deionized water before bacteria challenge. The concentration of bacteria in the influent is $4.4 \times 10^7$ per ml. The results are shown in Table 3.

TABLE 3

| Example | Influent Concentration of B. subtilis/ml | Effluent Concentration of B. subtilis/ml | Log Reduction |
|---|---|---|---|
| 8 | $9.3 \times 10^5$ | $3.0 \times 10^3$ | 2.5 |
| 9 | $2.0 \times 10^7$ | $3.4 \times 10^3$ | 3.8 |
| 10 | $4.4 \times 10^7$ | <1 | >7.6 |

Examples 11-12: These examples illustrate the use of a HFM module precoated as in Example 10 Challenged with E. coli.

Example 11

A 10 ppm chlorine solution made from 12 liters of sterile deionized water is circulated through a filter housing that has 0.5 liter void volume and that has a commercially available HFM having the specifications of the module used in Example B1. The solution is circulated at 0.75 gpm for 10 minutes. The chlorine solution then is drained from the filter housing, and then the housing is flushed with 12 L of sterile deionized water. The free chlorine concentration measured at the end of this process is less than 0.02 ppm free chlorine. Then, 11 L of E. coli bacteria challenge solution that has a concentration of $8.6 \times 10^5$ is pumped at 0.75 gpm through the filter. A 10 ml of sample of effluent is collected after the 11 L of the bacteria challenge solution is passed through the filter. The 10 ml sample of effluent then is treated with 0.1 mL of Chamber Neutralizer Solution. Then, the sample of effluent and its five 10-fold serial dilution samples are spread onto standard MacConkey agar plates. The colony counting technique is the standard method. The results are shown in Table 4.

Example 12

Using a commercially available HFM module having the specifications of the module used in Example B1, the procedure of example 11 is followed except that 10.0 g of Dicalite 215 is added by opening the housing of the HFM module after the 10 ppm chlorine solution is passed through the module as described above, followed by closing the housing and flushing with 12 L of sterile deionized water before bacteria challenge. The results are shown in Table 4.

TABLE 4

| Example | Influent Concentration of E. coli/ml | Effluent Concentration of E. coli/ml | Log Reduction |
|---|---|---|---|
| 11 | $8.6 \times 10^5$ | $2.3 \times 10^2$ | 3.6 |
| 12 | $7.3 \times 10^6$ | <1 | >6.9 |

Figure 2:
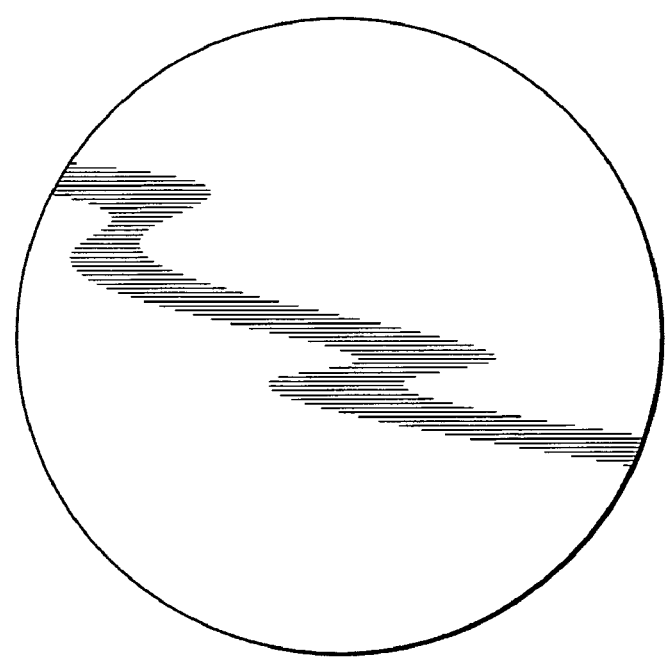
FIG. 2 is a top view of the filter device shown in FIG. 1.
Figure 1A:
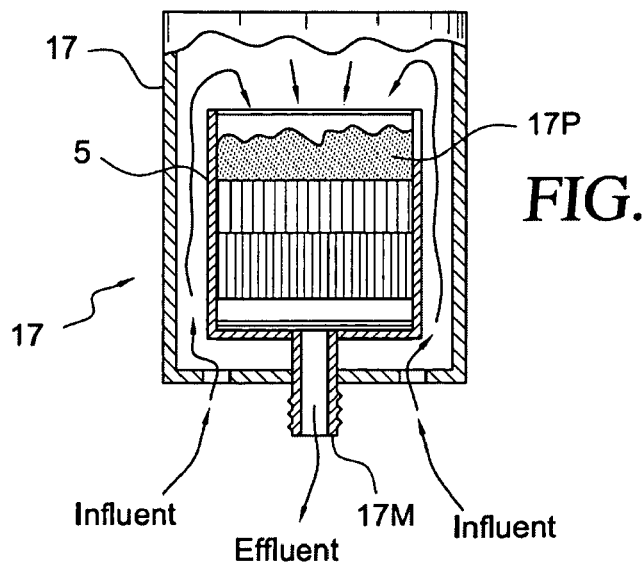
FIG. 1A is a partial cross sectional view of an alternative embodiment of the device of FIG. 1 having treatment media disposed on the microporous filter.
Figure 1B:
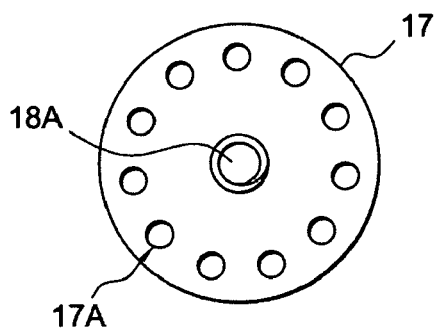
FIG. 1B is an end view of the device of FIG. 1A.
Figure 1C:
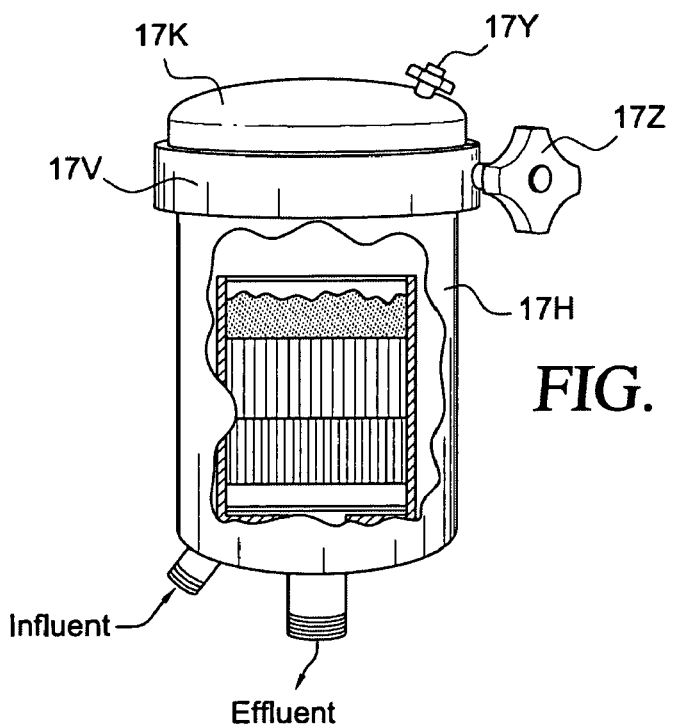
FIG. 1C is a partial cross section view of the device of FIG. 1A disposed in a housing.

In a further aspect, and as shown in FIGS. 1-1C, and 2, a new filter device 1 is disclosed. Filter cartridge device 1 includes a filter such as an HFM microporous filter 5 and bactericide chamber 10 positioned in housing 15. Housing 15 may be in the form of a cylinder, such as a right circular cylinder, that includes receiver 19. Receiver 19 extends upwardly from the bottom of housing 15 and is configured to include a filter section for retaining microporous filter 5 and also configured to form bactericidal chamber 10. Receiver 19 includes effluent port 35. Optional porous particulate retention support 45A may be positioned between chamber 10 and filter 5 and optional porous particulate retention support 45B may be positioned between chamber 10 and outlet 35. O-ring 47 may be located on filter 5 for engaging receiver 19.

A variety of materials may be used for the various components of filter device 1. Housing 15 may be made from materials such as acrylonitrile-butadiene-styrene ("ABS"), polypropylene ("PP") and polyethylene ("PE"). Receiver 19 also may be made from the materials such as ABS, PP, and PE. Cartridge housing 15 and its components such as receiver 19 may be made as one piece by well known methods such as injection molding. Optional porous supports 45A and 45B each may be made from the same or different materials such as PP, PE, and metal. Porous supports 45A, 45B each may have a pore size of about 5 μm to about 10,000 μm, preferably about 50 μm to about 5,000 μm, more preferably about 100 μm to about 2,000 μm.

Bactericidal chamber 10 may include bactericidal and bacteriostatic media such as MB2001, MB2002, MB2050, and MB2200 from Apyron Technologies, KDF alloy from KDF Fluid Treatment, Inc., silver metal and X-262 from Bestech and mixtures thereof. Reactive cationic polyamine-polyamide polymers, modified carbon such as carbon block, as well as mixtures thereof such as those described in U.S. Pat. No. 6,565,749 also may be used as bactericidal and bacteriostatic media. Hollow cylindrical carbon blocks which have bacteria and virus removal properties such as Model no. MATRIKX®+CR1-B from KX Industries also may be present in bactericidal chamber 10.

Microporous filter 5 typically may include hollow fiber or pleated membranes. Suppliers of useful microporous filters 5 may be found at: http://www.tcn.zaq.ne.jp/membrane/english/MembManufE.htm A hollow fiber membrane filter employed in microporous filter 5 may be precoated with particulates as described above to improve its performance. Space 50 shown in FIG. 1 between filter 5 and housing 15 may be filled with particulates such as but not limited to surface activated titanium dioxide, activated carbon, activated carbon impregnated with silver, Cu—Zn alloys such as KDF Metal from KDF Fluids, Inc, MB 2001 (silver coated alumina), MB2002 (copper coated alumina), MB2050 (mixed MB2001 and MB2002), and MB2200 (silver coated alumina), diatomaceous earth, pumice, perlite, silica, alumina, activated carbon, silver, copper, glass fibers, polyethylene, polypropylene, cellulose, metal oxides, metal hydroxides, polyesters, polymeric sodium phosphate, dipotassium phosphate, graphite, glass, and mixtures thereof. These particulates may be modified by reactive cationic polyamine-polyamide polymers such as those described in U.S. Pat. No. 6,565,749. Space 50 also may be filled with treatment media such as but not limited to slow dissolving polyphosphates such as Siliphos from Cistermiser and SLOW PHOS from Pacific Standard Specialties and Micromet from Nu Calgon, graphite, polyphosphates and mixtures thereof, as well as clays, zeolites, (FeOOH) and mixtures thereof. These particulates may be modified by reactive cationic polyamine-polyamide polymers such as those described in U.S. Pat. No. 6,565,749. Useful slow dissolving polyphosphate particles are made of polymeric sodium phosphate. Other phosphates which may be used include but are not limited to dipotassium phosphate (DKP). Alternatively, microporous filter 5 may be precoated to include particulates as described above prior to locating filter 5 in housing 15.

During manufacture of filter device 1, bactericidal chamber 10 is formed in receiver 19 and microporous filter 5 then is placed into receiver 19. Water treatment media such as activated carbon and bacteriastatic media such as MB2001 may be deposited into housing 15 in space 50 located upstream of receiver 19 and filter 5. End cap 60 then is secured to the open end of housing 15.

In use, influent such as water is passed through inlets 57 and through water treatment in space 50. The influent, when it reaches the top of housing 15, is directed downwardly through microporous filter 5 through chamber 10 and then through outlet 35.

In an alternative embodiment, as shown in FIGS. 1A-1C, microporous filter 5 is positioned in cartridge container 17 having influent openings 17A in the bottom thereof as shown in FIG. 1B. Filter 5, as shown in FIG. 1A, includes precoat material 17P thereon. Container 17 may be placed in housing 17H that includes ports for influent and effluent. Housing 17H is joined to head 17K having vent 17Y. Head 17K may be secured to housing 17H by V-clamp 17V equipped with tightening knob 17Z. Precoat material 17P may be any of but not limited to activated carbon, activated carbon impregnated with silver, Cu—Zn alloys such as KDF Metal from KDF Fluids, Inc, MB 2001 (silver coated alumina), MB2002 (copper coated alumina), MB2050 (mixed MB2001 and MB2002), MB2200 (silver coated alumina), slow dissolving polyphosphates such as Siliphos from Cistermiser and SLOW PHOS from Pacific Standard Specialties and Micromet from Nu Calgon and mixtures thereof.

In use, influent enters container 17 through openings 17A. Influent then flows into precoat material 17P and into filter 5 to apply precoat material 17P onto filter 5. The resulting effluent then exits through tube 17M.

In a further aspect, and as shown in FIGS. 3 to 7, novel microfiltration devices 70, 80, 90, 100 and 110, respectively, are disclosed. FIGS. 3-7 show microfiltration devices 70 to 110 in a vertical orientation whereby influent flows vertically downwardly through a top inlet and leaves the filter through a bottom outlet. It is to be understood that this orientation is exemplary only and the filters may be employed in any orientation.

Figures 3, 3A:
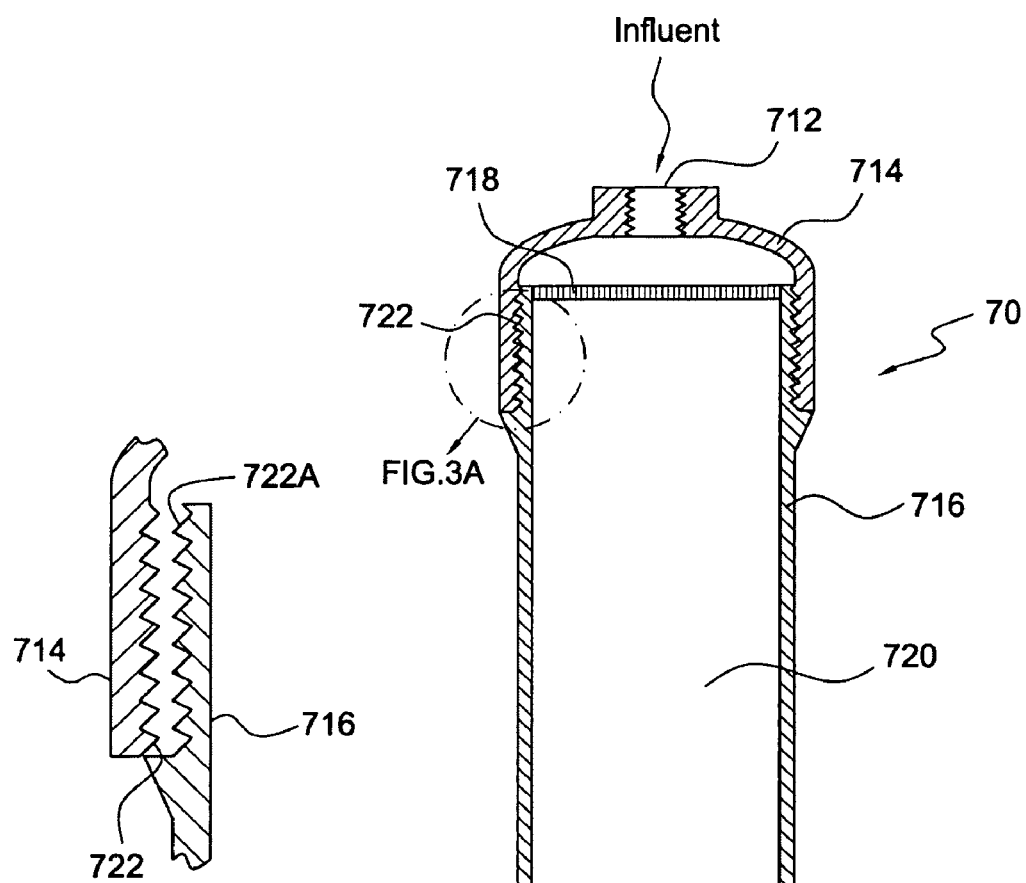
FIG. 3 is a cross sectional view of a first embodiment of a microfiltration device.
FIG. 3A is the detail of the screw threads of FIG. 3.

In one aspect, as shown in FIGS. 3 and 3A, microfiltration device 70 includes cap 714 having connection means such as screw threads 722. As shown in detail in FIG. 3A, threads 722 are adapted for joining to corresponding screw threads 722A in housing 716. Cap 714 has an influent inlet 712 for admitting influent such as water into the interior of housing 716. Housing 716 may be in the form of an elongated cylinder such as a right circular cylinder. Inlet prefilter 718 is located proximate inlet 712. Inlet prefilter 718 may be made from materials such as PP, PE, and metal and may have a pore size of about 5 µm to about 10,000 µm, about 50 µm to about 5,000 µm, more preferably about 100 µm to about 2,000 µm. Inlet prefilter 718 resists particulates, especially large particulates from entering the interior of microfiltration device 70. Bottom support 750 is located at the bottom of microfiltration device 70 proximate effluent outlet 754. Bottom support 750 also may be made from materials such as PP, PE, and metal such as brass and stainless steel and may have a pore size of about 5 µm to about 10,000 µm, preferably about 50 µm to about 5000 µm, more preferably about 100 µm to about 2000 µm. Plug 740 is located at the bottom of housing 716.

Figure 8:
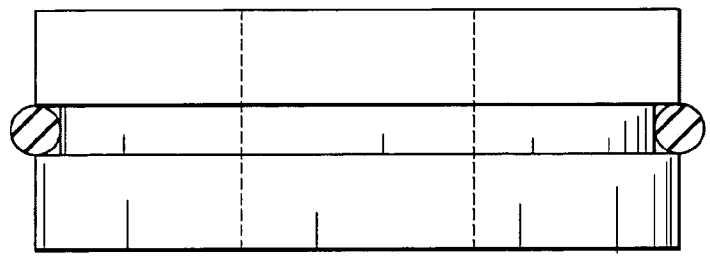
FIG. 8 is a side view of a prior art single O-ring plug.
Figure 8A:
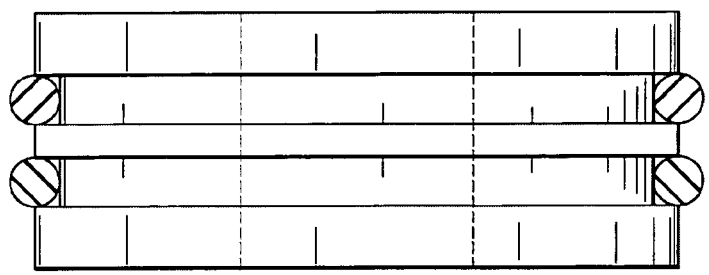
FIG. 8A is a side view of a prior art double O-ring plug.
Figure 9:
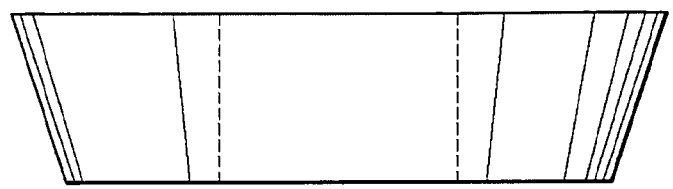
FIG. 9 is a side view of tapered plug.

Plug 740 has a central hole therein and rests on bottom support 750 and engages the interior side wall of housing 716. Plug 740 may be any of a well known single O-ring type plug as shown in FIG. 8 and double O-ring as shown in FIG. 8A. Plug 740 also may be tapered from its top surface to its bottom surface as shown in FIG. 9 where the extent of taper is about 1 to about 20 percent, preferably about 5 percent to about 15 percent, more preferably about 4 percent to about 12 percent from the top surface of the plug to its bottom surface. Plug 740 having any of the configurations shown in FIGS. 8 through 13 is especially suitable for use in a housing such as housing 716 which has uniformly straight interior or slightly tapered side walls as shown in FIG. 3.

Filter 730, preferably an HFM filter, engages the central hole of plug 740. The bottom of filter 730 abuts bottom support 750. Filter 730 may be any of hollow fiber or pleated membrane modules. Other suppliers may be found at http://www.tcn.zaq.ne.jp/membrane/english/MembManufE.htm.

Filter 730 may be precoated with particulates as described above to improve performance. Also, the exposed surfaces of filter 730 and upper chamber 720 between inlet prefilter 718 and plug 740 may be filled with treatment media. Treatment media may be any of but not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH) such as Aqua-Bind SP60 and SP70 from Apyron Technologies, activated titanium dioxide such as MetSorb from Graver Technologies, as well as micro fibers of polyesters, graphite, polyphosphates, glass and alumina and mixtures thereof for treatment of aqueous influents; treatment media such as zeolites, activated carbon, alumina, silica, MB2001, MB2002, and MB2200 and mixtures thereof for treatment of gaseous influents such as nitrogen and air; treatment media such as zeolites, alumina, silica, and ion-exchange resins such as NRW 37 of Purolite and mixtures thereof for treatment of organic liquid influents having such as C1-C4 alkanols. Treatment media also may be used to precoat filter 730 as described above with use of precoat particulates. These particulates and treatment media may be modified by reactive cationic polyamine-polyamide polymers such as those described in U.S. Pat. No. 6,565,749.

Figure 11:
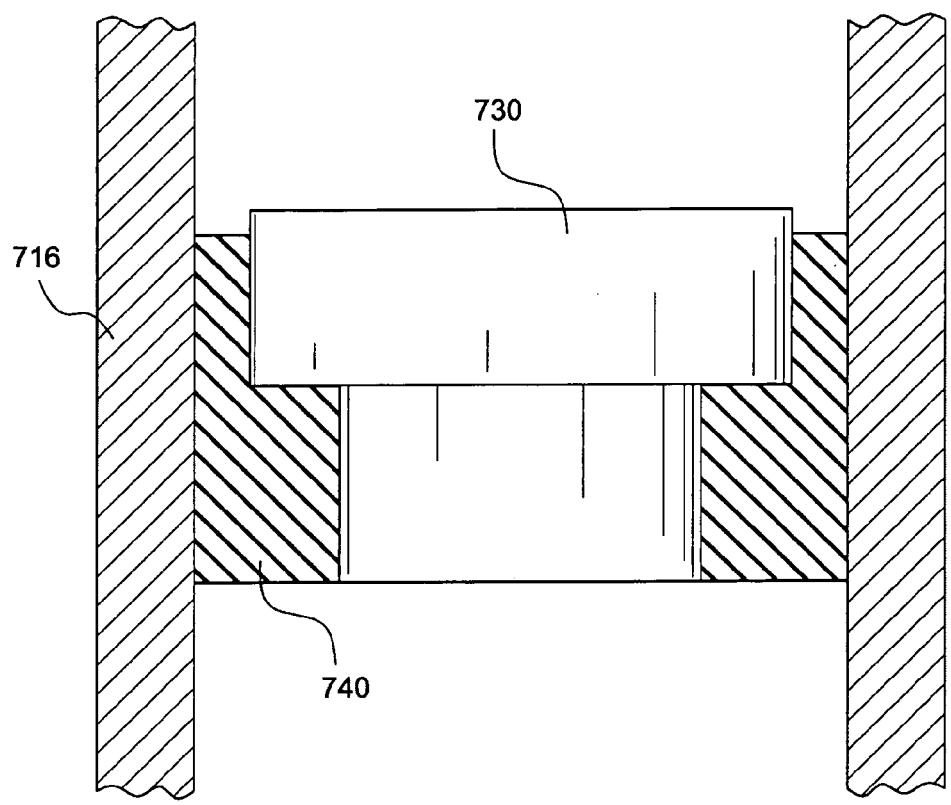
FIG. 11 is a partial cross section view of a plug that has a one step wall configuration.
Figure 12:
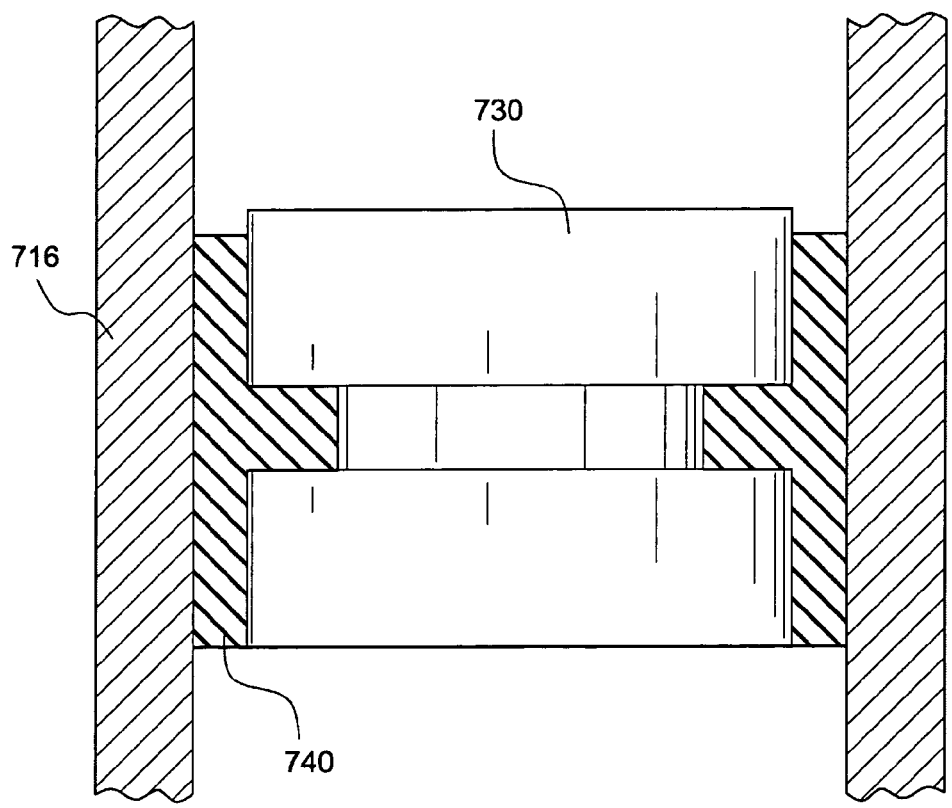
FIG. 12 is a partial cross section view of a plug that has a two step wall configuration.
Figure 13:
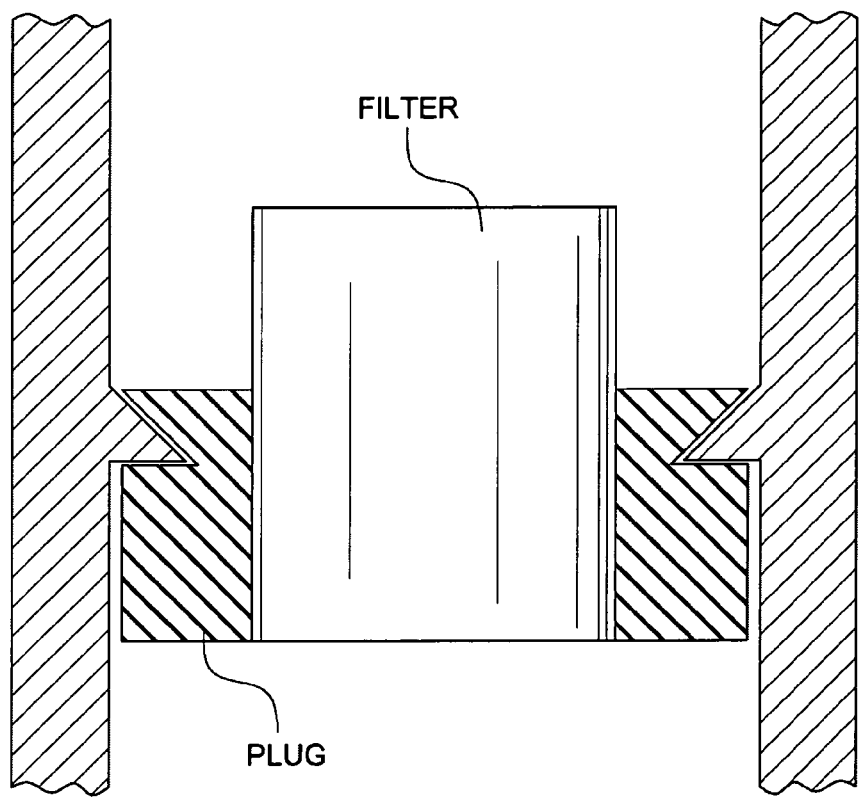
FIG. 13 is a partial cross section view of a plug that has a chevron seal configuration.

As shown in FIG. 3, filter 730 and plug 740 have uniformly straight side walls. Filter 730 and plug 740, however, as shown in FIG. 11, may have one step side walls. Also, as shown in FIG. 12, filter 730 and plug 740 may have two top side walls.

Figure 4:
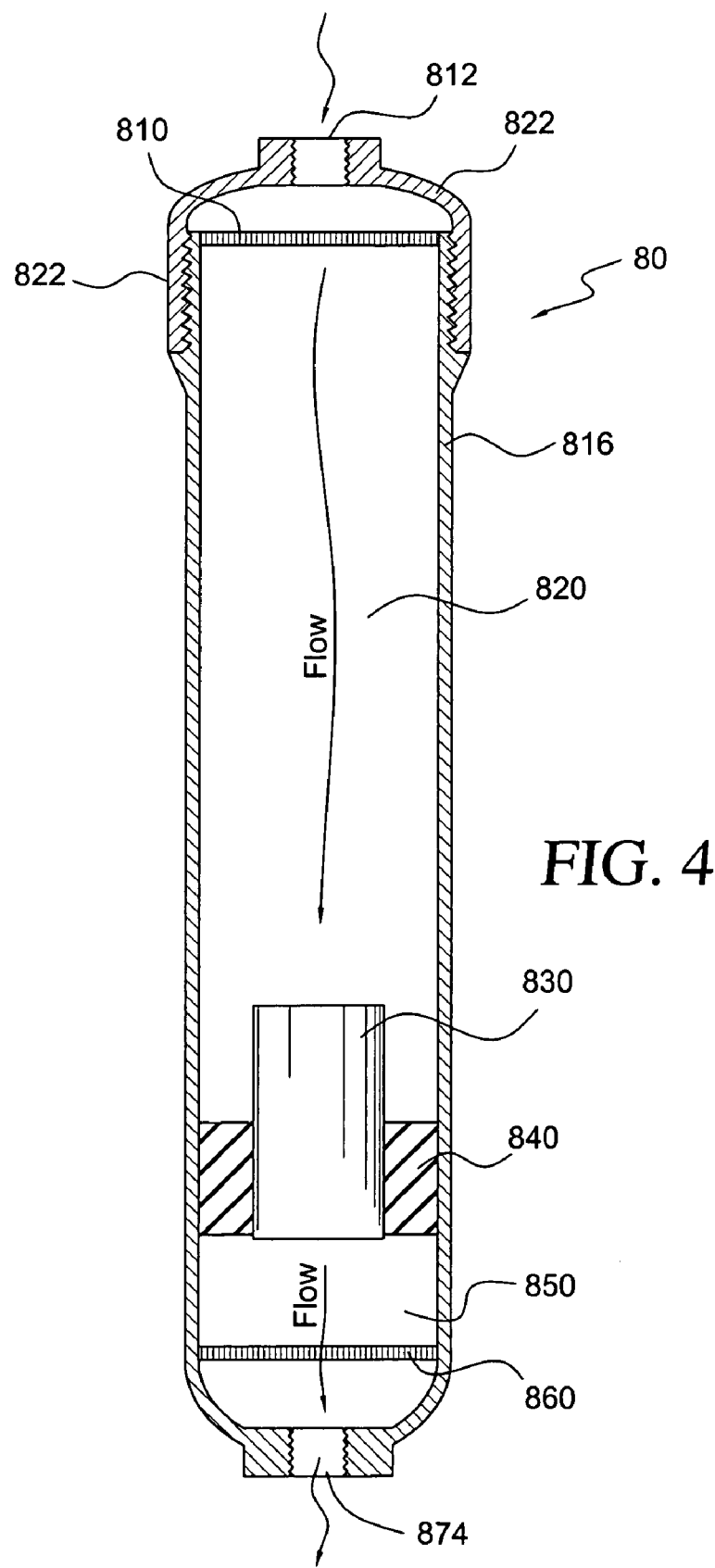
FIG. 4 is a cross sectional view of a second embodiment of a microfiltration device.

Another aspect of a microfiltration device is shown in FIG. 4. This device is similar to that shown in FIG. 3 except that lower chamber 850 is provided between plug 840 having filter 830, preferably an HFM filter, therein and bottom support 860. Filter device 80, shown in FIG. 4, includes cap 822 having means such as screw threads adapted for joining to corresponding screw threads in housing 816 in the manner shown in FIG. 3A. Cap 822 has inlet 812 for admitting influent such as water into the interior of housing 816. Housing 816 may be in the form of an elongated cylinder such as a right circular cylinder. Inlet prefilter 810 is located proximate inlet 812. Inlet prefilter 810 may be made from materials such as PP, PE, and metal such as stainless steel or brass and may have a pore size of about 5 µm to about 10,000 µm preferably about 20 µm to about 1,000 µm, more preferably about 20 µm to about 100 µm. Inlet prefilter 810 resists particulates, especially large particulates from entering the interior of the filter.

Figure 10:
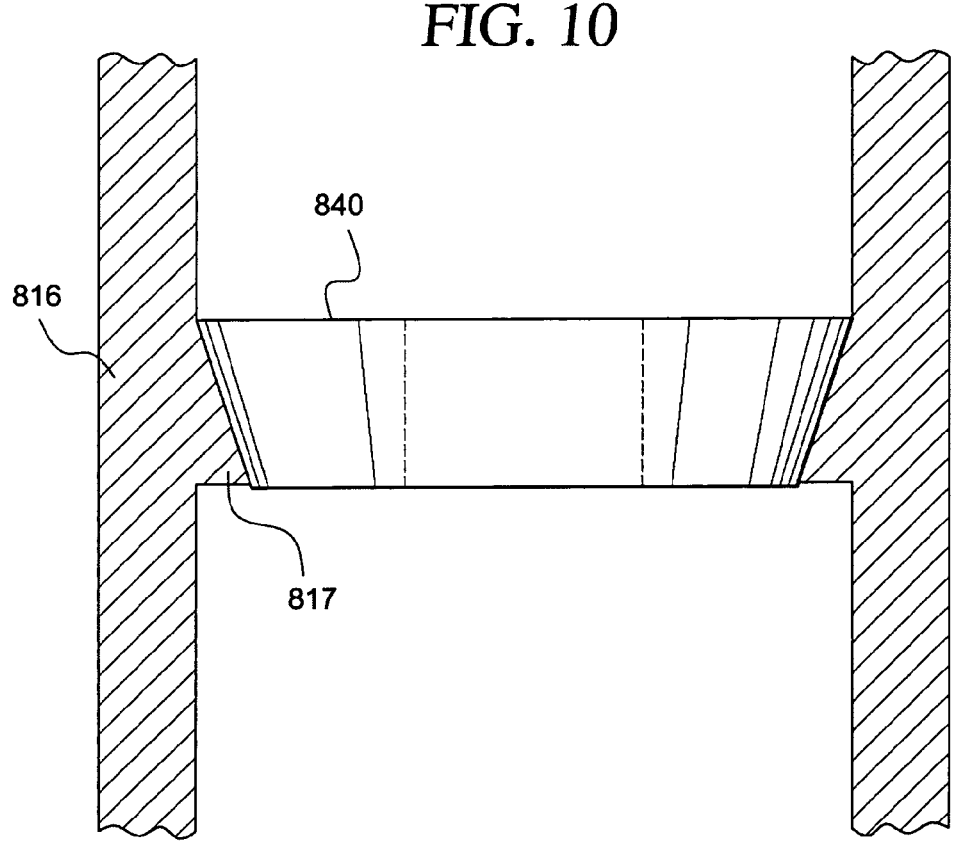
FIG. 10 is a partial cross section view of a tapered plug in contact with a tapered section of a housing.

Bottom support 860 is located at the bottom of filter device 80 proximate outlet 874. Bottom support 860 also may be made from materials such as PP, PE, and metal such as stainless steel and brass and may have a pore size of about 5 μm to about 10,000 μm preferably about 50 μm to about 5,000 μm, more preferably about 100 μm to about 2000 μm. Plug 840 may be tapered as shown in FIG. 9 and have the configuration of a chevron seal as in FIG. 13. This configuration of plug 840 are especially suitable for use where housing 816 has inwardly tapered wall section 817 as shown in FIG. 10 located intermediate inlet 812 and outlet 874. Tapered section of plug 840 engages tapered section 817 to retain plug 840. Plug 840 may be secured to section 817 to create lower chamber 850 between plug 840 and bottom support 860. Lower chamber 850 may be filled with treatment media. Plug 840 has a central hole for engaging filter 830 and the bottom surface of filter 830 may contact treatment media in lower chamber 850. Treatment media which may be present in lower chamber 850 may be the same or different from treatment media which may be present in upper chamber 820.

Filter 830 may be any of hollow fiber or pleated membrane modules. Hollow fiber membrane modules for use in filter 830 may be found at http://www.tcn.zaq.ne.jp/membrane/english/MembManufE.htm. Filter 830 may be precoated with precoat particulates as described above to improve performance. Exposed surfaces of filter 830 in upper chamber 820 may be surrounded by treatment media. Treatment media which may be present in upper chamber 820 may be any of but not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH), as well as micro fibers of polyesters, polyphosphates, graphite, glass and alumina and mixtures thereof for treatment of aqueous influents; treatment media such as zeolites, activated carbon, alumina, silica, MB2001, MB2002, and MB2200 and mixtures thereof for treatment of gaseous influents such as nitrogen and air; treatment media such as zeolites, alumina, silica, and ion-exchange resins such as NRW 37 of Purolite and mixtures thereof for treatment of organic liquid influents having such as C1-C4 alkanols. The treatment media may have a variety of shapes such as granular, spheres, powder, fiber and mixtures thereof, or shaped structures such as a mixture of powdered carbon and binder. Treatment media in the form of particulates may be used to precoat filter 830 in-situ as generally described above. These particulates and treatment media may be modified by reactive cationic polyamine-polyamide polymers such as those described in U.S. Pat. No. 6,565,749.

Figure 5:
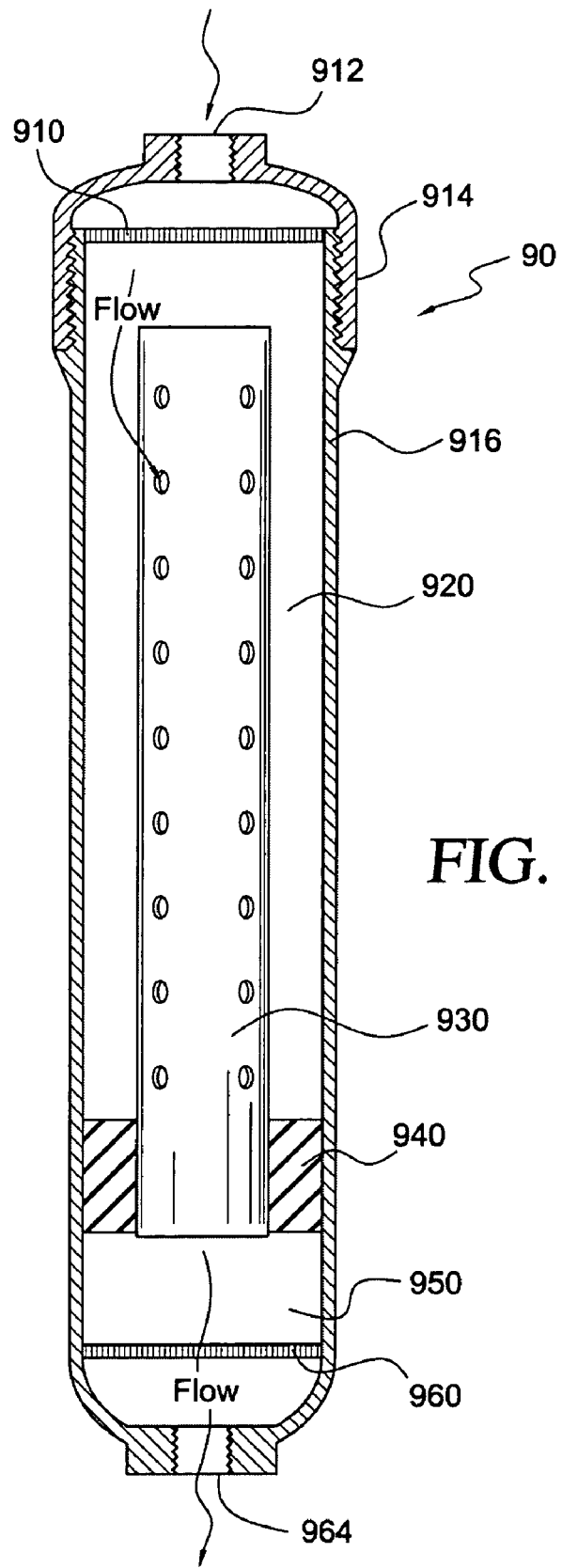
FIG. 5 is a cross sectional view of a third embodiment of a microfiltration device.

In yet another aspect, filter device 90, as shown in FIG. 5 includes cap 914 having means such as screw threads adapted for joining to corresponding screw threads in housing 916 in the manner shown in FIG. 3A. Cap 914 has inlet 912 for admitting influent such as water into the interior of housing 916. Housing 916 may be in the form of an elongated cylinder such as a right circular cylinder. Inlet prefilter 910 is located proximate inlet 912. Inlet prefilter 910 may be made from materials such as PP, PE, and metal such as stainless steel and brass and mixtures thereof and may have a pore size of about 5 μm to about 10,000 μm preferably about 20 μm to about 1,000 μm, more preferably about 20 μm to about 100 μm. Inlet prefilter 910 resists particulates from entering the interior of the filter. Bottom support 960 is located at the bottom of filter device 90 proximate outlet 964. Bottom support 960 also may be made from materials such as PP, PE, and metal such as stainless steel and brass and may have a pore size of about 5 μm to about 10,000 μm preferably about 50 μm to about 5,000 μm, more preferably about 100 μm to about 2000 μm. Plug 940 is located at a position intermediate inlet prefilter 910 and bottom support 960. In one aspect where the interior side wall surface of housing 916 is uniformly straight, plug 940 may have a configuration corresponding to plug 740. Where the interior sidewall of housing 916 has an inwardly tapered section similar to that of section 817 shown in FIG. 10, plug 940 may have any one of the configurations of plug 840 shown in FIGS. 10 and 13 to facilitate locating plug 940 distal to bottom support 960 to create lower chamber 950 between plug 940 and bottom support 960. Lower chamber 950 may be filled with treatment media such as but not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH), as well as micro fibers of polyesters, graphite, polyphosphates, glass and alumina and mixtures thereof for treatment of aqueous influents. Treatment media which may be present in lower chamber 950 may include but not limited to zeolites, activated carbon, alumina, silica, MB2001, MB2002, and MB2200 and mixtures thereof for treatment of gaseous influents such as nitrogen and air; Treatment media such as zeolites, alumina, silica, and ion-exchange resins and mixtures thereof for treatment of organic liquid influents having such as C1-C4 alkanols. These particulates and treatment media may be modified by reactive cationic polyamine-polyamide polymers such as those described in U.S. Pat. No. 6,565,749.

As shown in FIG. 5, filter 930 such as a hollow fiber membrane filter engages the central hole of plug 940 and the bottom surface of filter 930 may contact a treatment media such as water treatment media which may be present in chamber 950. Filter 930 may have a perforated wall and includes hollow fiber or pleated membrane modules and extends substantially throughout the length of housing 916. Hollow fiber membrane modules for use in filter 930 may be found at http://www.tcn.zaq.ne.jp/membrane/english/MembManufE.htm. Filter 930 may be precoated with particulates as described above to improve its performance. Alternatively, treatment media such as water treatment media may be used to precoat filter 930 as described above with particulates prior to locating filter 930 in housing 916. The treatment media may surround exposed surfaces of filter 930 in upper chamber 920. Treatment media which may be present in upper chamber 920 may be the same or different from treatment media present in lower chamber 950 an may include but not limited to any of surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH), as well as micro fibers of polyesters, graphite, polyphosphates, glass and alumina and mixtures thereof for treatment of aqueous influents; treatment media such as zeolites, activated carbon, alumina, silica, MB2001, MB2002, and MB2200 and mixtures thereof for treatment of gaseous influents such as nitrogen and air; treatment media such as zeolites, alumina, silica, and ion-exchange resins such as NRW 37 of Purolite and mixtures thereof for treatment of organic liquid influents having such as C1-C4 alkanols. The media may have a variety of shapes such as granular, spheres, powder, fiber and mixtures thereof, or shaped structures such as a mixture of powdered carbon and binder. These particulates and treatment media may be modified by reactive cationic polyamine-polyamide polymers such as those described in U.S. Pat. No. 6,565,749.

Figure 6:
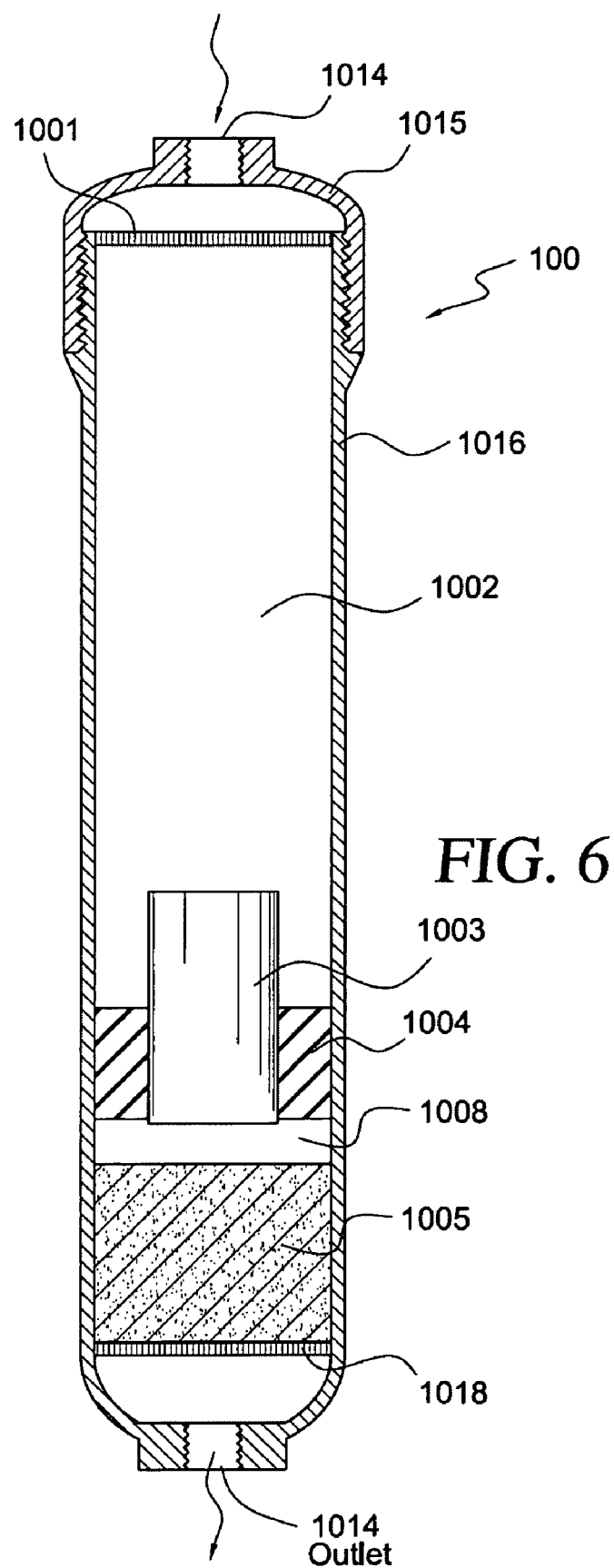
FIG. 6 is a cross sectional view of a fourth embodiment of a microfiltration device.

In a further aspect, as shown in FIG. 6, microfiltration device filter 100 includes cap 1015 having means such as screw threads adapted for joining to corresponding screw threads in housing 1016 in the manner shown in FIG. 3A. Cap 1015 has inlet 1014 for admitting influent such as water into the interior of housing 1016. Housing 1016 may be in the form of an elongated cylinder such as a right circular cylinder. Inlet prefilter 1001 is located proximate inlet 1014. Inlet prefilter 1001 may be made from materials such as PP, PE, and metal such as stainless steel and brass and may have a pore size of about 5 µm to about 10,000 µm preferably about 20 µm to about 1000 µm, more preferably about 20 µm to about 100 µm. Inlet prefilter 1001 functions to prevent particulates from entering the interior of the filter. Bottom support 1018 is located at the bottom of filter 100 proximate outlet 1014. Bottom support 1018 may be made from materials such as PP, PE, and metal such as stainless steel and brass and may have a pore size of about 5 µm to about 10,000 µm preferably about 50 µm to about 5000 µm, more preferably about 100 m to about 2000 µm. A shaped filtration medium 1005 formed of, such as, bonded porous powdered carbon and binder, abuts bottom support 1018. Medium 1005 such as bonded porous powdered carbon may be obtained by KX Industries, L.P. Plug 1004, having filter 1003 therein, may be located distal to shaped filtration medium 1005 to form lower chamber 1008 between plug 1004 and filtration medium 1005. Lower chamber 1008 and upper chamber 1002 may each be filled with the same or different treatment media such as but not limited to surface activated titanium dioxide, diatomaceous earth, pumice, clays, perlite, silica, alumina, zeolites, activated carbon, metals such as silver and copper, glass fibers, fibrillated fibers of polyethylene, polypropylene and cellulose, metal oxides and hydroxides such as ferric oxide-hydroxide (FeOOH), as well as micro fibers of polyesters, polyphosphates, graphite, glass and alumina and mixtures thereof for treatment of aqueous influents; treatment media such as zeolites, activated carbon, alumina, silica, MB2001, MB2002, and MB2200 and mixtures thereof for treatment of gaseous influents such as nitrogen and air; treatment media such as zeolites, alumina, silica, and ion-exchange resins such as NRW 37 of Purolite and mixtures thereof for treatment of organic liquid influents having such as C1-C4 alkanols. The media may have a variety of shapes such as granular, spheres, powder, fiber and mixtures thereof, or shaped structures such as a mixture of powdered carbon and binder.

Plug 1004, where the interior wall surface of housing 1016 is uniform, may have a configuration corresponding to any of the configurations of plug 740. Where the interior sidewall of housing 1016 has an inwardly tapered section similar to section 817 shown in FIG. 10, plug 1004 may have any one of the configurations of plug 840.

Filter 1003, preferably an HFM filter, shown in FIG. 6 may employ hollow fiber or pleated membranes. Filter 1003, optionally having perforations therein, may have a length about equal to the length of the interior of housing 1016. Hollow fiber membrane modules for use in filter 1003 may be found at http://tcn.zaq.ne.jp./membrane/english/MembManufE.htm. Filter 1003 may be precoated with precoat particulates as described above to improve its performance. Alternatively, treatment media may be used to precoat filter 1003 as described above with particulates.

Figure 7:
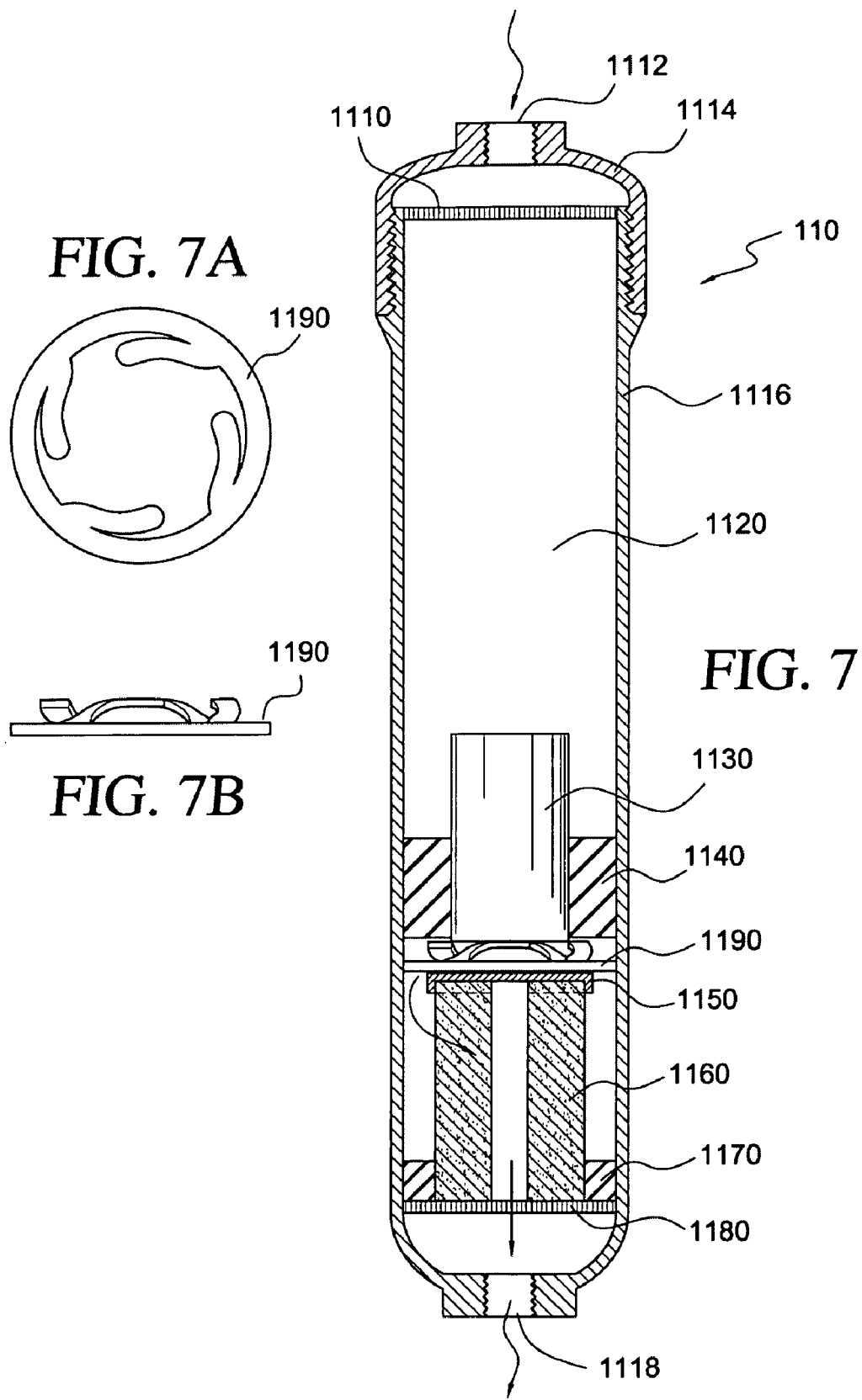
FIG. 7 is a cross sectional view of a fifth embodiment of the filter of a microfiltration device.

In an additional aspect, as shown in FIG. 7, cartridge filter 110 includes cap 1114 having means such as screw threads adapted for joining to corresponding screw threads in housing 1116 in the manner shown in FIG. 3A. Cap 1114 has inlet 1112 for admitting influent such as water into the interior of housing 1116. Housing 1116 may be in the form of an elongated cylinder such as a right circular cylinder. Inlet prefilter 1110 is located proximate inlet 1112. Inlet prefilter 1110 may be made from materials such as PP, PE, and metal such as stainless steel and brass and may have a pore size of about 5 µm to about 10,000 µm, preferably about 20 µm to about 1,000 µm, more preferably about 20 µm to about 100 µm. Inlet prefilter 1110 resists particulates, especially large particulates from entering the interior of the filter. Bottom support 1180 is located at the bottom of radial flow filter 1160 proximate outlet 1118. Bottom support 1180 may be made from materials such as PP, PE, and metal such as stainless steel and brass and may have a pore size of about 5 µm to about 10,000 µm, preferably about 50 µm to about 5,000 µm, more preferably about 100 µm to about 2,000 µm.

A radial flow filter 1160 such as a hollow cylindrical carbon block filter from KX Industries, L.P. having end cap 1150 thereon is inserted into auxiliary plug 1170 and contacts bottom support 1180. Auxiliary plug 1170 may have a configuration corresponding to plug 740. Auxiliary plug 1170 may be made from rubber and may be obtained from Plasticoid Corp. Spacer 1190 having a configuration such as that shown in FIGS. 7A, 7B rests on end cap 1150 of carbon block 1160 and engages hollow filter membrane 1130 located in plug 1140. Spacer 1190 may be formed of polypropylene and may be formed of webbing and may be obtained from Inter-Net, Inc.

Any of the plugs disclosed above such as plug 1170 may be made from materials such as rubber and may be used with any of the above-disclosed filters such as filters 1130, preferably an HFM filter. Filter 1130 is positioned in housing 1116 to form upper space 1120. Upper space 1120 may include treatment media for use with various types of influents. Treatment media which may be employed with aqueous liquid influents include but are not limited to surface activated titanium dioxide, diatomaceous earth, pumice, clays, perlite, silica, alumina, zeolites, activated carbon, metals such as silver, copper and zinc, glass fibers, fibrillated fibers such as polyethylene, polypropylene and cellulose, metal oxides and hydroxides such as ferric oxide-hydroxide (FeOOH), micro fibers of polyesters, graphite, polyphosphates, glass and alumina and mixtures thereof. Treatment media which may be employed with gaseous influents such as nitrogen and air include but are not limited to zeolites, activated carbon, alumina, silica, MB2001, MB2002, and MB2200 and mixtures thereof. Treatment media which may be employed with organic liquid influents which include such as C1-C4 alkanols include but are not limited to zeolites, alumina, silica, and ion-exchange resins and mixtures thereof. These particulates and treatment media may be modified by reactive cationic polyamine-polyamide polymers such as those described in U.S. Pat. No. 6,565,749.

Any of housings such as housing 1116 disclosed above as well as any of caps such as cap 1114 may be made from a wide range of materials such as PP, PE and ABS. Also, caps such as caps 1114 may have a smooth interior surface for engaging housings which have a smooth exterior surface. In this aspect, a cap may be secured to a housing by methods such as ultrasonic welding, spin-bonding as well as EMABOND methods. The length of microfiltration filters such as filters 1202 may vary over a wide range, and may include a perforated wall such as shown in FIG. 5.

A further embodiment of the invention relates to a filter cartridge for enabling reverse flow, as shown in FIGS. 14A-14C, for use in stacked and stepped filtration. In this embodiment, hollow tube HFM modules 1200 as shown in FIGS.

14A-14B are employed for reverse flow. A hollow tube membrane module 1200 is made by securing one or more drain tubes 1205 in a HFM filter 1202. Drain tubes 1205 may be formed from a variety of compositions and have a wide range of cross sections. Compositions which may be employed include but are not limited to ABS, PP, PE resins. Useful cross sections of drain tubes 1205 include but are not limited to circular, square, rectangular, diamond and the like. The inner diameter as well as the outer diameter of drain tubes 1205 may taper along the length of the tube. The inner diameter of drain tubes 1205 preferably is chosen to achieve a flow rate of effluent that equals the flow rate of influent. Drain tubes 1205 may be located at positions other than the central axis of filters 1202, preferably at the central axis of filters 1202. Drain tubes 1205 may be secured in membrane filter 1202 by removing one or more portions of filter 1202 and securing one or more tubes 1205 in those areas where portions of the filter were removed. Drain tubes 1205 may be secured in filter 1202 by adhesives such as polyurethane or epoxy resin or polyethylene.

As shown in FIG. 15A, module 1200 may be secured in cartridge container 1210 to provide single module hollow tube membrane filtration device 1215. Module 1200 is secured in rubber seal plug 1220 such as that shown in FIGS. 15B and 15C. Plug 1220 having module 1200 therein is secured in cartridge container 1210 by frictional engagement of plug 1220 against the interior wall of container 1210.

Lower chamber 1221 between the bottom of module 1200 and the bottom of housing 1210 may vary in size. Lower chamber 1221 typically is minimized when lower chamber 1221 is free of treatment media. When, however, an amount of treatment media is provided in lower chamber 1221, then lower chamber 1221 is made sufficient in size to include the treatment media.

Figure 16A:
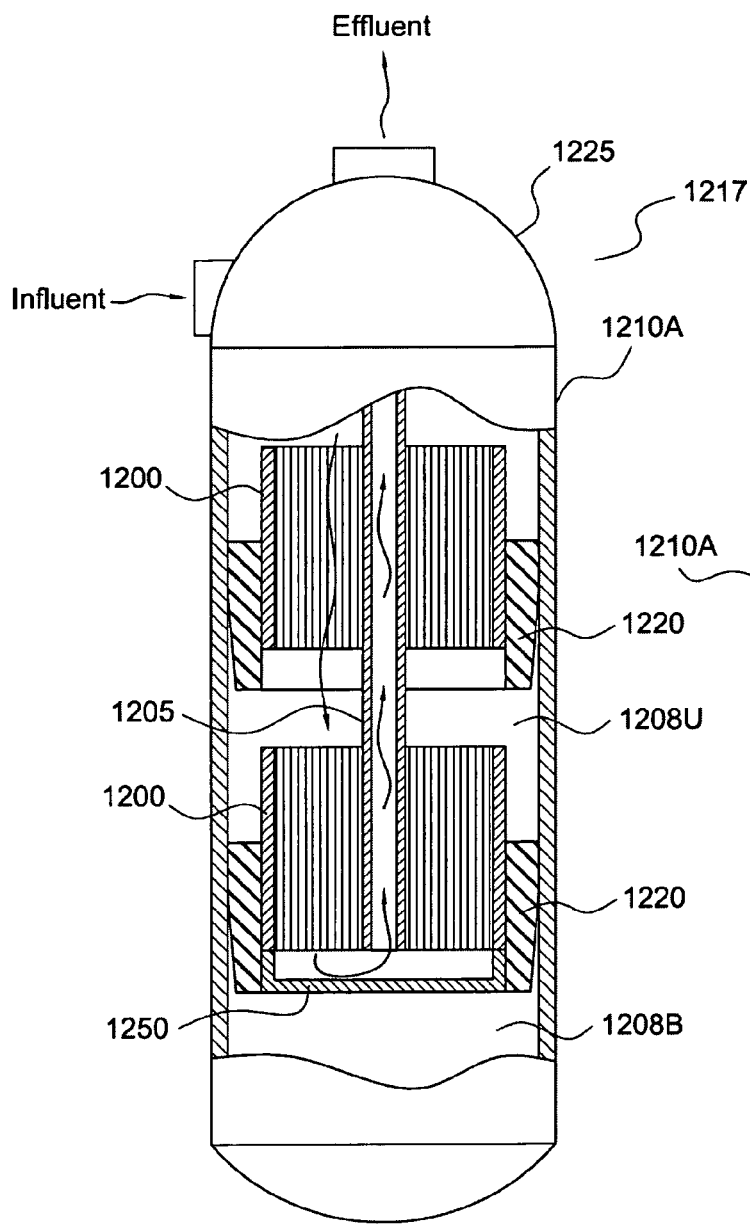
FIG. 16A shows a stacked hollow fiber membrane device in partial cross section.
Figure 16B:
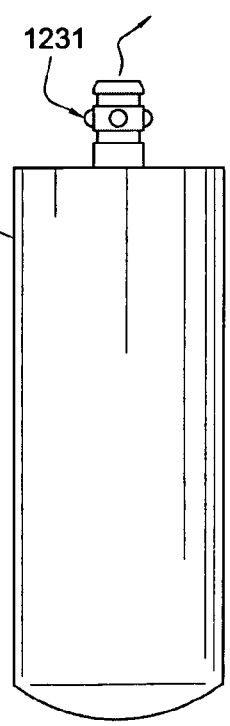
FIG. 16B is a side view of the container 1210A of FIG. 16A.
Figure 16C:
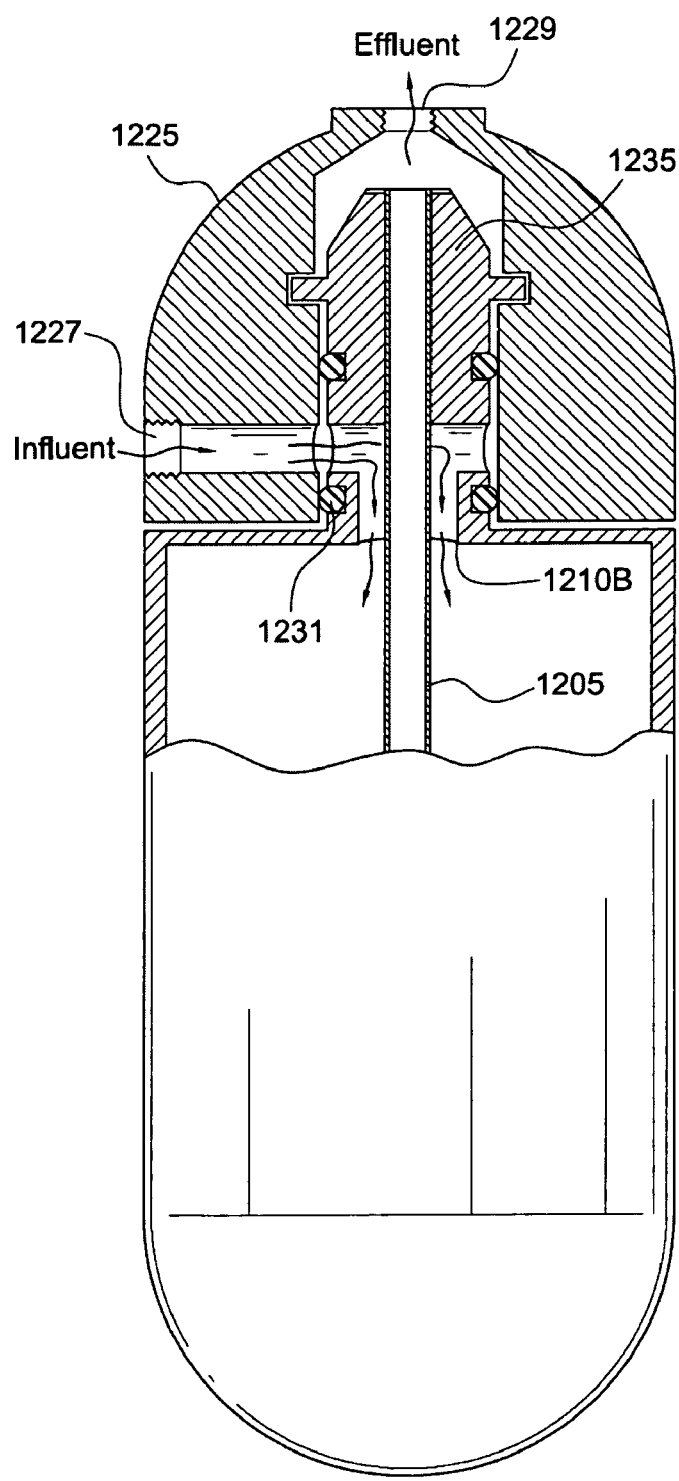
FIG. 16C is a side cross sectional view of a closed end cap for use in the stacked filter cartridge device of FIG. 16A.

In yet an another embodiment, a plurality of modules 1200 may be stacked vertically as shown in FIGS. 16A-16C along drain tube 1205 to form a stacked membrane filter cartridge 1217 for serial flow and step filtration. Stacked filter cartridge 1217 includes container 1210A and cap 1225. Stacked filter cartridge 1217, as shown in FIG. 16A, includes two modules 1200 which are vertically stacked on hollow drain tube 1205. As shown in FIG. 16A, lower module 1200 includes closed end cap 1250 shown in FIGS. 17,17A. As illustrated in FIG. 16A, two filter modules 1200 are vertically stacked on hollow drain tube 1205 along the central axis of each of filter membrane modules 1200. It is to be understood, however, that any number of membrane filter modules 1200 may be vertically stacked and each module may have different pore size ranges. In addition, it is be understood that a plurality of hollow drain tubes 1205 may be secured in hollow fiber membrane filter modules 1200 and that tubes 1205 may be located at other than the central axis of membrane filter module 1200.

Container 1210A, as shown in FIG. 16B, may include double O-ring seal 1231. Cap 1225 may be joined to container 1210A by methods such as sonic welding and spin welding. Cap 1225 also may be joined to container 1210A by twist-lock engagement. Cap 1225 includes inlet port 1227 and outlet port 1229. Inlet port 1227 is configured to engage opening 1210B of container 1210A to enable influent to enter container 1210A. Drain tube plug 1235 shown in FIG. 16C is secured to drain tube 1205 and facilitates alignment of tube 1205 with outlet 1229 of cap 1225.

Upper space 1208U between stacked modules 1200 may vary. Upper space 1208U however, is sufficient to enable fluid flow with minimum restriction. Also, lower space 1208B between lower module 1200 and the bottom of cartridge container 1210A is sufficient to enable unrestricted flow. Lower space 1208B is minimized when treatment media is not provided between the bottom of module 1200 and the bottom of housing 1210A. When, however, treatment media is to be provided in lower space 1208B, then lower space 1208B is made sufficient in size to include the treatment media.

In use, influent enters port 1227 and flows into container 1210A through inlet 1210B. Influent then flows through upper module 1200 and through lower module 1200. The resulting effluent then flows through tube 1205 and exits cartridge 1217 through outlet port 1229.

Figure 16D:
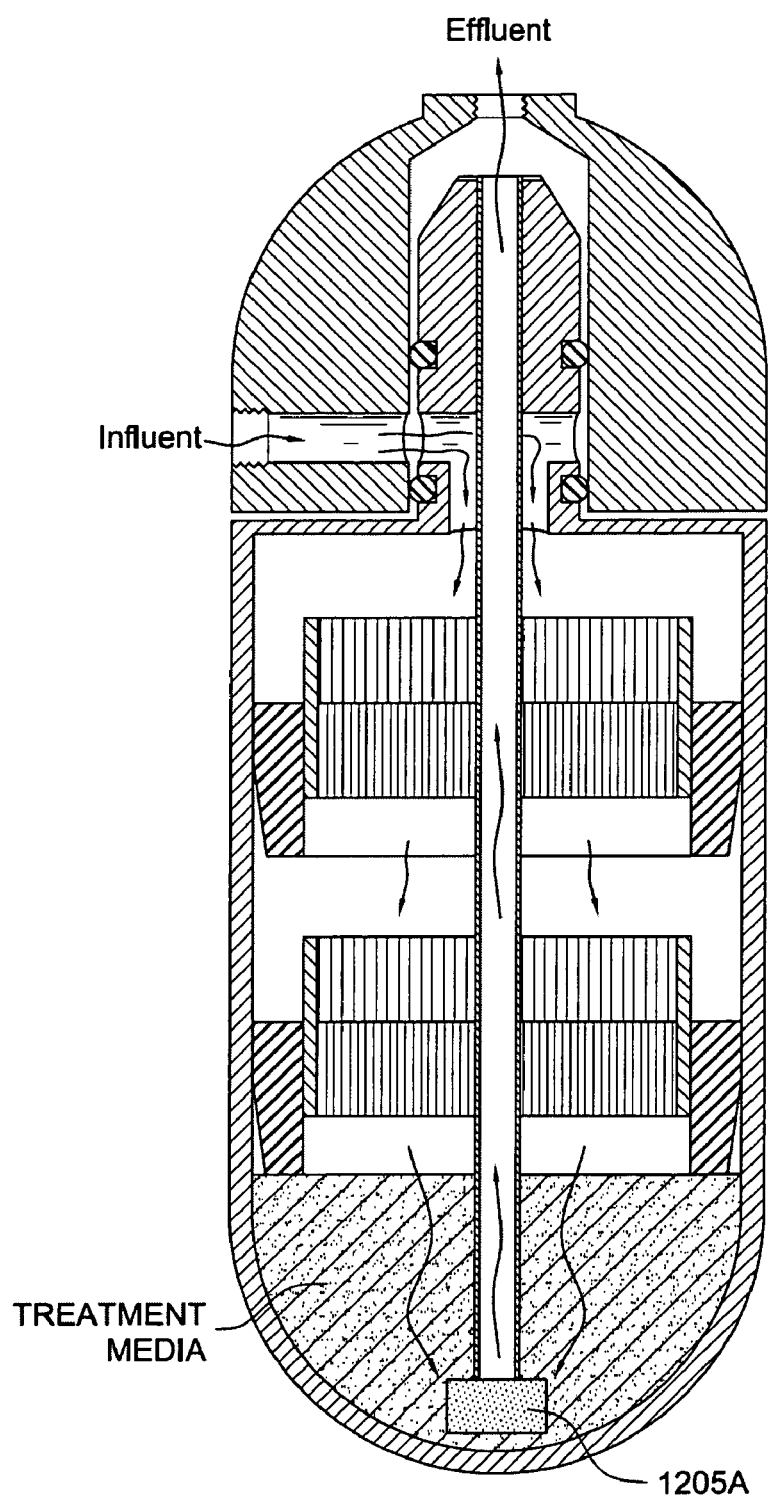
FIG. 16D shows, in partial cross section, a filter cartridge that includes an alternative stacked configuration of hollow fiber membrane modules and which includes treatment media in the bottom of the cartridge.

In the embodiment shown in FIG. 16A, cap 1250 shown in FIG. 17A is employed and spaces 1208U and 1208B each may be free of treatment media. When treatment media, however, is included in lower space 1208B as shown in FIG. 16D, drain tube 1205 extends into the treatment media and porous drain tube end cap 1205A is fitted to tube 1205. Treatment media which may be employed with aqueous liquid influents include but are not limited to surface activated titanium dioxide, diatomaceous earth, pumice, clays, perlite, silica, alumina, zeolites, activated carbon, metals such as silver, copper and zinc, glass fibers, fibrillated fibers such as polyethylene, polypropylene and cellulose, metal oxides and hydroxides such as ferric oxide-hydroxide (FeOOH), micro fibers of polyesters, graphite, polyphosphates, glass and alumina and mixtures thereof. Treatment media which may be employed with gaseous influents such as nitrogen and air include but are not limited to zeolites, activated carbon, alumina, silica, MB2001, MB2002, and MB2200 and mixtures thereof. Treatment media which may be employed with organic liquid influents which include such as C1-C4 alkanols include but are not limited to zeolites, alumina, silica, and ion-exchange resins and mixtures thereof. Porous drain tube end cap 1205A may be formed from porous PE or PP, which can be obtained from Porex Corporation. These particulates and treatment media may be modified by reactive cationic polyamine-polyamide polymers such as those described in U.S. Pat. No. 6,565,749.

In use, influent enters cartridge 1240 and flows through upper module 1200 and then through lower module 1200. Effluent exits cartridge 1240 by hollow tubes 1205.

Figure 18:
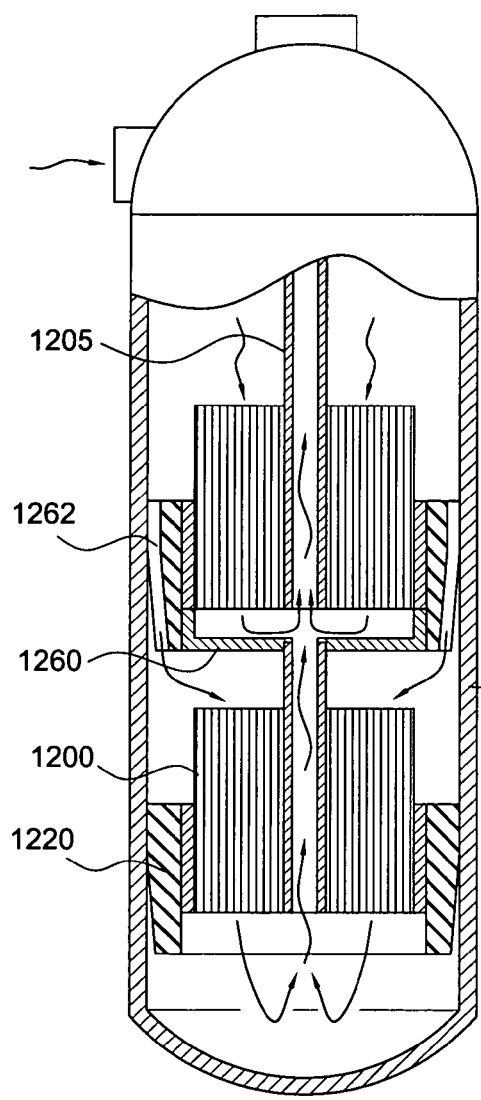
FIG. 18 shows, in partial cross section, a filter cartridge that includes a stacked configuration of hollow fiber filtration modules.
Figure 18B:
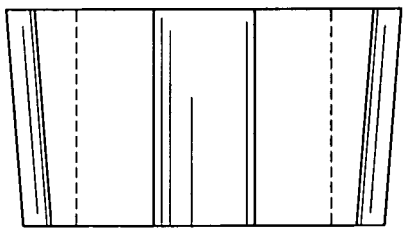
FIG. 18B is a side view of the seal plug of FIG. 18A.
Figure 18A:
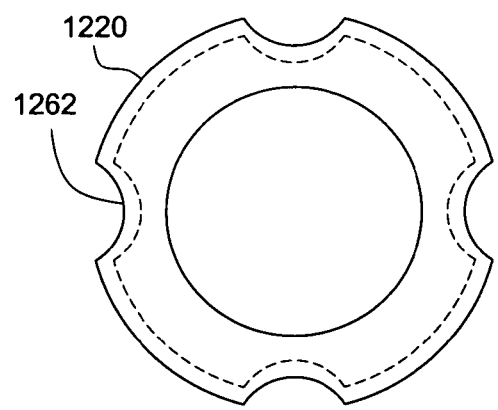
FIG. 18A is a top view of a rubber seal plug for use in the cartridge of FIG. 18.

In yet another embodiment, a plurality of modules 1200 may be joined as in FIG. 18, to produce filter cartridge 1240 for parallel influent flow and serial effluent flow. In this embodiment, lower module 1200 that includes hollow tube 1205 is secured in cartridge container 1245 by seal plug 1220. Tube 1205 extends beyond lower module 1200 to engage open end cap 1260 shown in FIGS. 17B, 17C in upper module 1200. Seal plug 1220 frictionally engages module 1200 and is frictionally secured to cartridge container 1245. Seal plug 1220 includes peripheral slots 1262 to enable influent to flow past upper module 1200 into lower module 1200.

Figure 19:
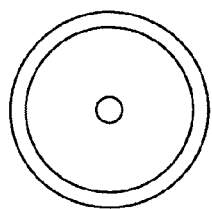
FIG. 19 is a top view of a filter cartridge of FIG. 19A.
Figure 19A:
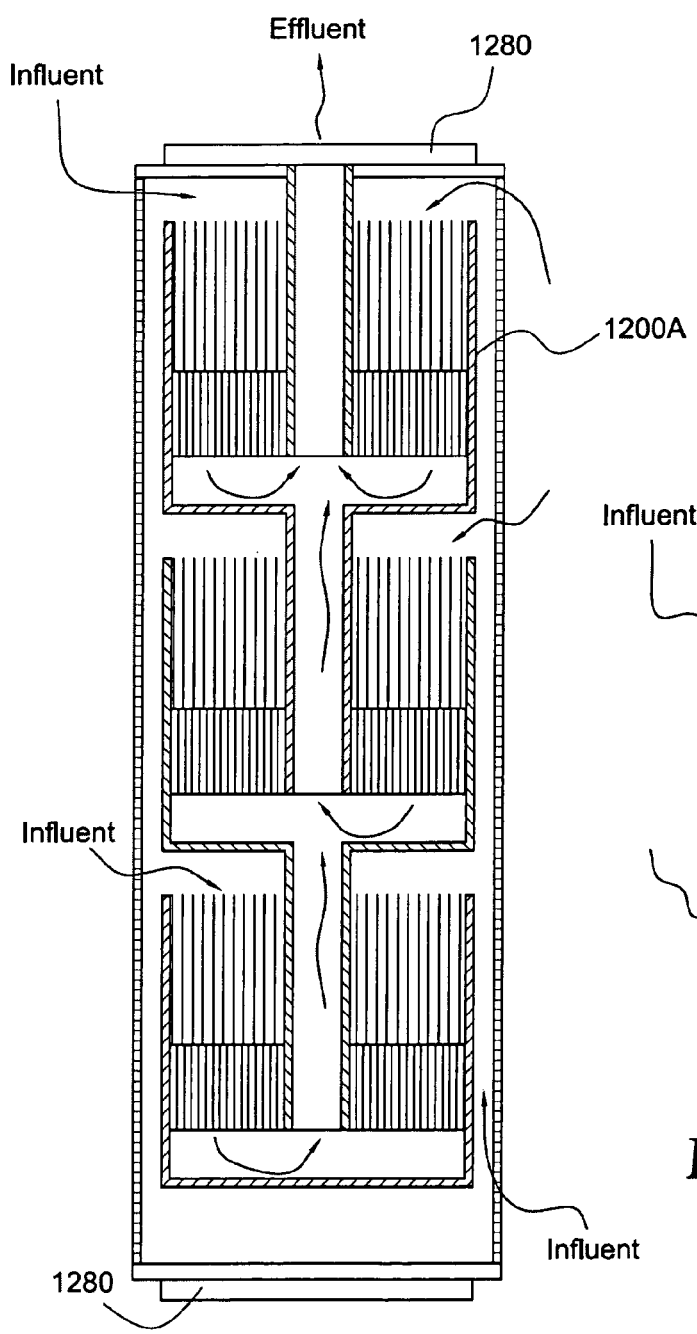
FIG. 19A shows a filter cartridge of that has stacked hollow fiber filtration modules.
Figure 19B:
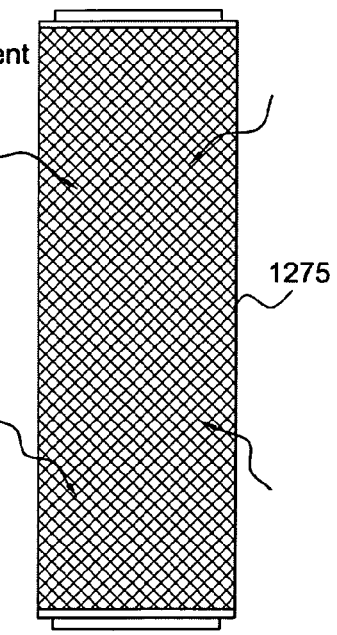
FIG. 19B is a side view of a porous container for use in the cartridge of FIG. 19.
Figure 19C:
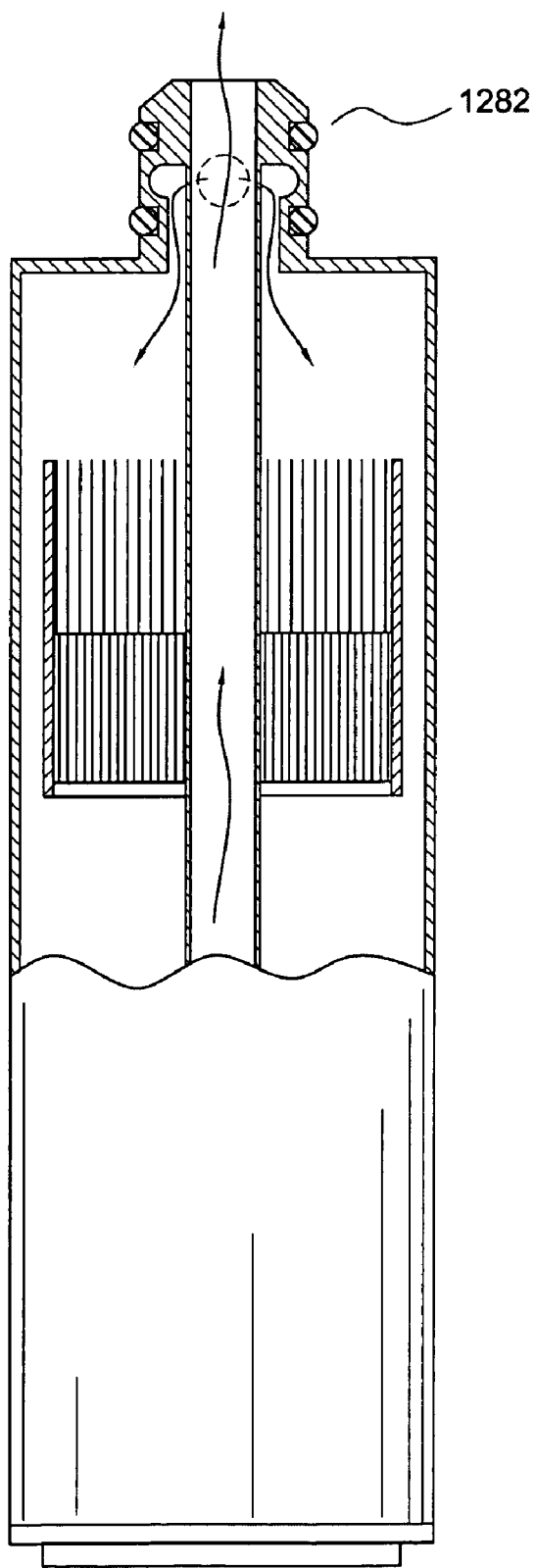
FIG. 19C is a side view in partial cross section of a container that includes a double O-ring seal and the cartridge of FIG. 19A.

In yet another embodiment as shown in FIGS. 19A-19C, a plurality of filtration modules 1200A are stacked to provide parallel flow in porous container 1275. In FIGS. 19A-19B a stacked filter design having a gasket at effluent outlet is employed. FIG. 19C shows another stack filters in porous container 1275 having an outlet with double O-ring seal 1282. The amount of space between stacked modules 1200A may vary. Spacing, however, is sufficient to enable fluid flow with minimum restriction. Also, the amount of space between the bottom of lowermost module 1200A and the bottom end cap is sufficient to enable unrestricted flow.

In manufacture, lowermost of modules 1200A is sonic welded to end cap 1250. Then, an additional module 1200A is secured in the lowermost of modules 1200A. An additional one or more modules 1200A then are similarly secured to form a stacked assembly. The stacked assembly is inserted into container 1275 and sealed by ultrasonic welding of end cap 1295, center tube 1284. Container 1275 may be formed from a variety of materials such as PE, PP, Nylon, ABS resins. The stacked modules may be sealed to the wall of porous container 1275 by ultrasonic welding or adhesives. Alternatively, the stacked modules may be secured by frictional fit into porous container 1275.

In one aspect, porous container 1275 may include upper and optional lower gaskets 1280 as shown in FIG. 19A for sealing within container 1275. Container 1275 may be formed from a variety of materials such as PE, PP, polyester, Nylon, ABS resins.

The pore sizes of the walls of container 1275 may vary. Pore sizes may vary from about 5 microns diameter to about 2 centimeters diameter, preferably about 100 microns to about 1 centimeter diameter, more preferably about 0.1 centimeter to about 1 centimeter diameter. The pores of the walls of container 1275 may have a wide range of configurations such circular, square, diamond, irregular, etc. The pores may be uniformly distributed on the side walls and also may be randomly distributed on the side walls of container 1275. The porosity of the side walls of container 1275 may vary from about 1% to about 99% of the surface area of container 1275, preferably from about 5% to about 90%, more preferably from about 10% to about 80%.

In another aspect, a prefiltration wrap of spun bond or melt-blown sheet may be secured to the exterior of container 1275 by ultrasonic or heat welding, and elastic netting. Useful prefiltration wrap materials include PP, PE and polyester.

In use, influent enters through the porous side walls of container 1275 and is filtered by modules 1200A. The resulting effluent exits through center tube 1284.

The invention claimed is:

1. A filter cartridge device comprising,
   a housing having an HFM microporous filter wherein the housing comprises an effluent port,
   a cap having an influent port secured to the housing,
   the housing having an inlet prefilter 810 proximate the influent port and wherein the HFM filter is intermediate between the inlet prefilter and the effluent port to define a first bactericidal chamber 820 between the inlet prefilter and HFM filter and a second bactericidal chamber 850 between the HFM filter and the effluent port of the housing, wherein bactericidal media selected from the group consisting of silver coated alumina, copper coated alumina, silver, copper, and mixtures thereof is present in each of the first bactericidal chamber and the second bactericidal chamber.

2. The filter cartridge device of claim 1 further including a porous particulate retention support between the second bactericidal chamber and the effluent port.

3. The device of claim 1 wherein the inlet prefilter has a pore size of about 5 μm to about 10,000 μm.

4. The device of claim 2 wherein the porous particulate retention support has a pore size of about 5 μm to about 10,000 μm.

* * * * *